(12) United States Patent
Kakutani

(10) Patent No.: US 8,517,494 B2
(45) Date of Patent: Aug. 27, 2013

(54) PRINTING APPARATUS, DITHER MASK, AND PRINTING METHOD

(75) Inventor: Toshiaki Kakutani, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 716 days.

(21) Appl. No.: 12/685,550

(22) Filed: Jan. 11, 2010

(65) Prior Publication Data

US 2010/0177137 A1 Jul. 15, 2010

(30) Foreign Application Priority Data

Jan. 15, 2009 (JP) ................................. 2009-007045

(51) Int. Cl.
*B41J 29/38* (2006.01)
*B41J 2/205* (2006.01)

(52) U.S. Cl.
USPC ................................................. 347/15; 347/9

(58) Field of Classification Search
USPC .......................................................... 347/15
See application file for complete search history.

(56) References Cited

U.S. PATENT DOCUMENTS

| 6,241,338 B1 | 6/2001 | Otsuki |
| 6,874,864 B1 | 4/2005 | Maeda et al. |
| 7,532,364 B2 | 5/2009 | Miyagi et al. |
| 7,986,440 B2 | 7/2011 | Yanai et al. |
| 2006/0187507 A1* | 8/2006 | Konno et al. ............... 358/521 |

FOREIGN PATENT DOCUMENTS

| JP | 2000-052543 A | 2/2000 |
| JP | 2002-096455 A | 4/2002 |
| JP | 2006-076005 A | 3/2006 |
| JP | 2007-112059 A | 5/2007 |
| JP | 2008-188805 A | 8/2008 |

\* cited by examiner

*Primary Examiner* — Uyen Chau N Le
*Assistant Examiner* — Kajli Prince
(74) *Attorney, Agent, or Firm* — Kilpatrick Townsend & Stockton LLP

(57) ABSTRACT

There is provided a printing apparatus having a nozzle row in a sub scanning direction; a halftone processing unit comparing each threshold value of a dither mask with image data; and a printing unit controlling ejection of ink from each nozzle by using a result of the halftone process. Here, a constant correspondence relationship is set between each position in a minimal repetition unit of a nozzle pattern and each threshold value of the dither mask applied to the each position. The dither mask includes at least one side of nozzles on both ends of the nozzle row or frontmost-end nozzles on both ends of the nozzle row in a print area having a predetermined range of an ink duty ratio. In addition, the plurality of threshold values are set such that a use ratio of front-end nozzles is lower than a use ratio of middle nozzles.

10 Claims, 18 Drawing Sheets

FIG. 4A
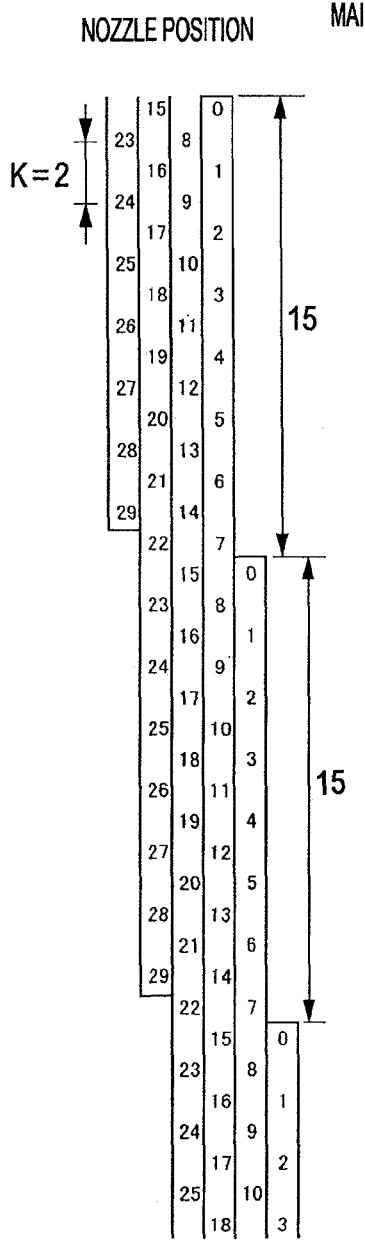
FIG. 4B
FIG. 4C

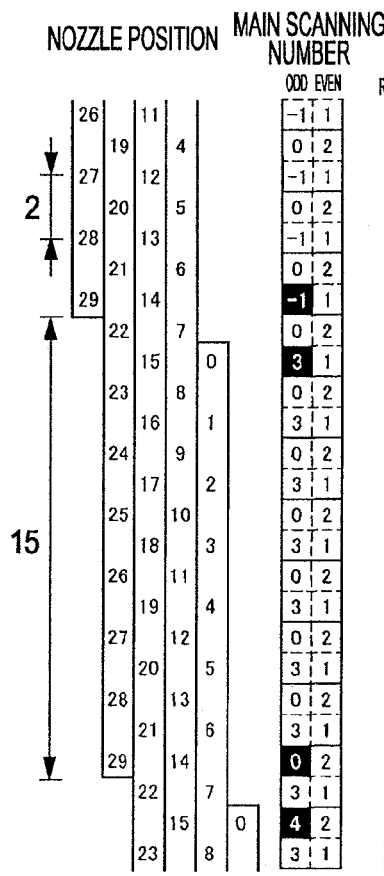

FIG. 6

|    | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 38 | 26 | 11 | 26 | 11 | 26 | 11 | 26 | 11 | 26 | 11 | 26 | 11 | 26 | 11 | 26 | 11 |
| 39 | 19 | 4 | 19 | 4 | 19 | 4 | 19 | 4 | 19 | 4 | 19 | 4 | 19 | 4 | 19 | 4 |
| 40 | 27 | 12 | 27 | 12 | 27 | 12 | 27 | 12 | 27 | 12 | 27 | 12 | 27 | 12 | 27 | 12 |
| 41 | 20 | 5 | 20 | 5 | 20 | 5 | 20 | 5 | 20 | 5 | 20 | 5 | 20 | 5 | 20 | 5 |
| 42 | 28 | 13 | 28 | 13 | 28 | 13 | 28 | 13 | 28 | 13 | 28 | 13 | 28 | 13 | 28 | 13 |
| 43 | 21 | 6 | 21 | 6 | 21 | 6 | 21 | 6 | 21 | 6 | 21 | 6 | 21 | 6 | 21 | 6 |
| 44 | 29 | 14 | 29 | 14 | 29 | 14 | 29 | 14 | 29 | 14 | 29 | 14 | 29 | 14 | 29 | 14 |
| 45 | 22 | 7 | 22 | 7 | 22 | 7 | 22 | 7 | 22 | 7 | 22 | 7 | 22 | 7 | 22 | 7 |
| 46 | 0 | 15 | 0 | 15 | 0 | 15 | 0 | 15 | 0 | 15 | 0 | 15 | 0 | 15 | 0 | 15 |
| 47 | 23 | 8 | 23 | 8 | 23 | 8 | 23 | 8 | 23 | 8 | 23 | 8 | 23 | 8 | 23 | 8 |
| 48 | 1 | 16 | 1 | 16 | 1 | 16 | 1 | 16 | 1 | 16 | 1 | 16 | 1 | 16 | 1 | 16 |
| 49 | 24 | 9 | 24 | 9 | 24 | 9 | 24 | 9 | 24 | 9 | 24 | 9 | 24 | 9 | 24 | 9 |
| 50 | 2 | 17 | 2 | 17 | 2 | 17 | 2 | 17 | 2 | 17 | 2 | 17 | 2 | 17 | 2 | 17 |
| 51 | 25 | 10 | 25 | 10 | 25 | 10 | 25 | 10 | 25 | 10 | 25 | 10 | 25 | 10 | 25 | 10 |
| 52 | 3 | 18 | 3 | 18 | 3 | 18 | 3 | 18 | 3 | 18 | 3 | 18 | 3 | 18 | 3 | 18 |
| 53 | 26 | 11 | 26 | 11 | 26 | 11 | 26 | 11 | 26 | 11 | 26 | 11 | 26 | 11 | 26 | 11 |
| 54 | 4 | 19 | 4 | 19 | 4 | 19 | 4 | 19 | 4 | 19 | 4 | 19 | 4 | 19 | 4 | 19 |
| 55 | 27 | 12 | 27 | 12 | 27 | 12 | 27 | 12 | 27 | 12 | 27 | 12 | 27 | 12 | 27 | 12 |
| 56 | 5 | 20 | 5 | 20 | 5 | 20 | 5 | 20 | 5 | 20 | 5 | 20 | 5 | 20 | 5 | 20 |
| 57 | 28 | 13 | 28 | 13 | 28 | 13 | 28 | 13 | 28 | 13 | 28 | 13 | 28 | 13 | 28 | 13 |
| 58 | 6 | 21 | 6 | 21 | 6 | 21 | 6 | 21 | 6 | 21 | 6 | 21 | 6 | 21 | 6 | 21 |
| 59 | 29 | 14 | 29 | 14 | 29 | 14 | 29 | 14 | 29 | 14 | 29 | 14 | 29 | 14 | 29 | 14 |
| 60 | 7 | 22 | 7 | 22 | 7 | 22 | 7 | 22 | 7 | 22 | 7 | 22 | 7 | 22 | 7 | 22 |

NOZZLE POSITION

MAIN SCANNING DIRECTION

SUB SCANNING DIRECTION

FIG. 12

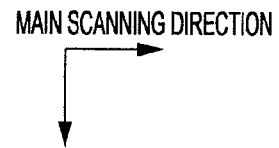
FIG. 15A
| MAIN SCANNING NUMBER | 1 | 2 | 3 | 4 | 5 | 6 | 7 | 8 |
|---|---|---|---|---|---|---|---|---|
| MAIN SCANNING DIRECTION | → | ← | → | ← | → | ← | → | ← |
| PAPER TRANSPORT AMOUNT | 7 | 6 | 7 | 8 | 7 | 6 | 7 | 8 |
MAIN SCANNING DIRECTION →
SUB SCANNING DIRECTION ↓
FIG. 15C
FIG. 15B
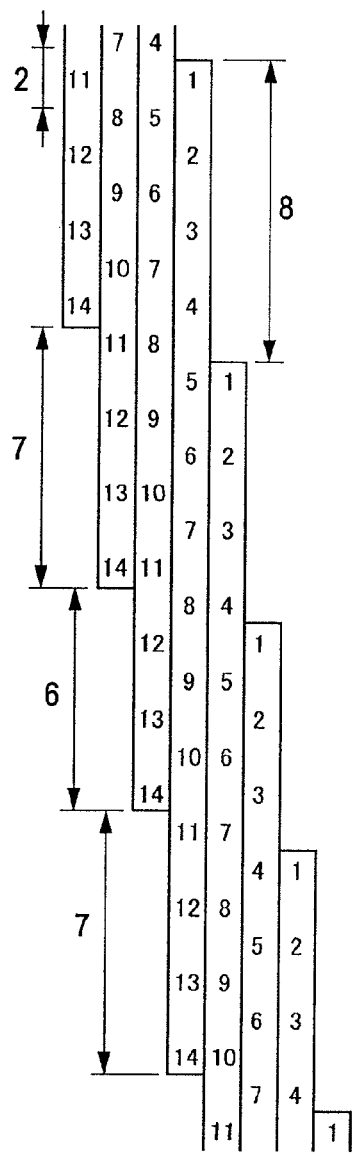
| MAIN SCANNING NUMBER | |
|---|---|
| ODD | EVEN |
| 2 | 3 |
| 1 | 4 |
| 2 | 3 |
| 1 | 4 |
| 2 | 3 |
| 1 | 4 |
| 2 | 3 |
| 1 | 4 |
| 2 | 3 |
| 5 | 4 |
| 2 | 3 |
| 5 | 4 |
| 2 | 3 |
| 5 | 4 |
| 2 | 3 |
| 5 | 4 |
| 6 | 3 |
| 5 | 4 |
| 6 | 3 |
| 5 | 4 |
| 6 | 3 |
| 5 | 4 |
| 6 | 7 |
| 5 | 4 |
| 6 | 7 |
| 5 | 4 |
| 6 | 7 |
| 5 | 4 |
| 6 | 7 |
| 5 | 8 |
RU
| ROW | COLUMN | NOZZLE NUMBER | | | | | |
|---|---|---|---|---|---|---|---|
| | | 1 | 2 | 3 | 4 | 5 | 6 |
| 1 | | 7 | 4 | 7 | 4 | 7 | 4 |
| 2 | | 11 | 1 | 11 | 1 | 11 | 1 |
| 3 | | 8 | 5 | 8 | 5 | 8 | 5 |
| 4 | | 12 | 2 | 12 | 2 | 12 | 2 |
| 5 | | 9 | 6 | 9 | 6 | 9 | 6 |
| 6 | | 13 | 3 | 13 | 3 | 13 | 3 |
| 7 | | 10 | 7 | 10 | 7 | 10 | 7 |
| 8 | | 14 | 4 | 14 | 4 | 14 | 4 |
| 9 | | 11 | 8 | 11 | 8 | 11 | 8 |
| 10 | | 1 | 5 | 1 | 5 | 1 | 5 |
| 11 | | 12 | 9 | 12 | 9 | 12 | 9 |
| 12 | | 2 | 6 | 2 | 6 | 2 | 6 |
| 13 | | 13 | 10 | 13 | 10 | 13 | 10 |
| 14 | | 3 | 7 | 3 | 7 | 3 | 7 |
| 15 | | 14 | 11 | 14 | 11 | 14 | 11 |
| 16 | | 4 | 8 | 4 | 8 | 4 | 8 |
| 17 | | 1 | 12 | 1 | 12 | 1 | 12 |
| 18 | | 5 | 9 | 5 | 9 | 5 | 9 |
| 19 | | 2 | 13 | 2 | 13 | 2 | 13 |
| 20 | | 6 | 10 | 6 | 10 | 6 | 10 |
| 21 | | 3 | 14 | 3 | 14 | 3 | 14 |
| 22 | | 7 | 11 | 7 | 11 | 7 | 11 |
| 23 | | 4 | 1 | 4 | 1 | 4 | 1 |
| 24 | | 8 | 12 | 8 | 12 | 8 | 12 |
| 25 | | 5 | 2 | 5 | 2 | 5 | 2 |
| 26 | | 9 | 13 | 9 | 13 | 9 | 13 |
| 27 | | 6 | 3 | 6 | 3 | 6 | 3 |
| 28 | | 10 | 14 | 10 | 14 | 10 | 14 |
| 29 | | 7 | 4 | 7 | 4 | 7 | 4 |
| 30 | | 11 | 1 | 11 | 1 | 11 | 1 |

FIG. 20A
| MAIN SCANNING NUMBER | -4 | -3 | -2 | -1 | 0 | 1 | 2 | 3 | 4 |
|---|---|---|---|---|---|---|---|---|---|
| MAIN SCANNING DIRECTION | ← | → | ← | → | ← | → | ← | → | ← |
| PAPER TRANSPORT AMOUNT | 15 | 15 | 15 | 15 | 15 | 15 | 15 | 15 | 15 |
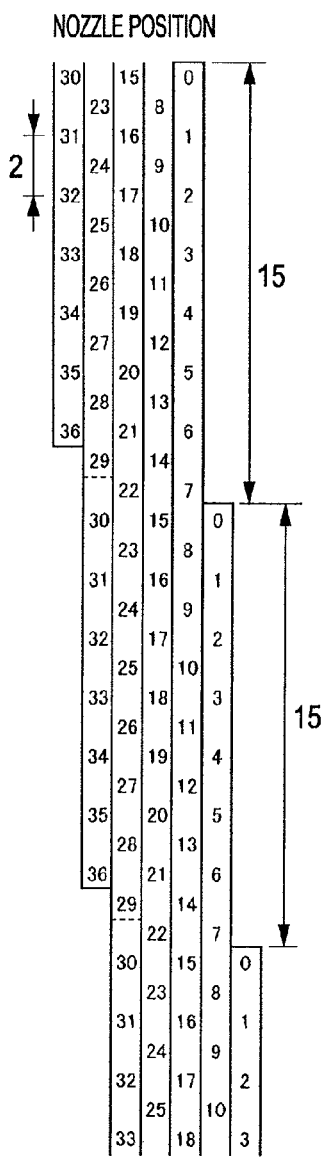
NOZZLE POSITION
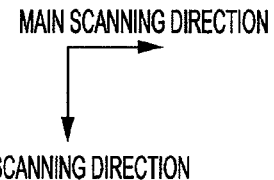
MAIN SCANNING DIRECTION
SUB SCANNING DIRECTION
FIG. 20B

PRINTING APPARATUS, DITHER MASK, AND PRINTING METHOD

This application claims priority to Japanese Patent Application No. 2009-007045, filed Jan. 15, 2009 the entirety of which is incorporated by reference herein.

BACKGROUND

1. Technical Field

The present invention relates to printing technology for performing printing by ejecting ink from a nozzle row while relatively moving a print head, which includes the nozzle row acquired by aligning a plurality of nozzles at a predetermined pitch in a sub scanning direction, in a main scanning direction and the sub scanning direction with respect to a printing medium.

2. Related Art

Recently, serial ink jet printers that perform printing by ejecting ink while relatively moving a print head in a main scanning direction and a sub scanning direction with respect to a printing medium have been widely used (for example, JP-A-2000-52543). In the serial ink jet printer, generally, degradation of the printing image quality due to banding is suppressed by performing interlaced scanning.

However, even when the interlaced scanning is performed, a joining portion between a dot that is formed by predetermined main scanning and a dot that is formed by other main scanning is inevitably generated in the sub scanning direction. In such a joining portion, the easiness of ink bleeding changes due to a difference of dot formation timings. Accordingly, uneven density occurs, whereby there is a problem that the printing image quality is degraded.

SUMMARY

An advantage of some aspects of the invention is that it provides a serial ink jet printer capable of suppressing the degradation of the printing image quality due to uneven density that occurs due to a difference in dot formation timings.

The invention can be implemented in the following forms or applications.

Application 1

There is provided a printing apparatus that performs printing while relatively moving a print head in a main scanning direction and a sub scanning direction with respect to a printing medium. The printing apparatus includes: a nozzle row that is installed on the print head and is acquired by aligning a plurality of nozzles, which ejects ink, in the sub scanning direction; a halftone processing unit that performs a halftone process by comparing each threshold value of a dither mask that is formed by a plurality of threshold values with image data that configures an image; and a printing unit that performs printing by controlling ejection of ink from each nozzle of the nozzle row by using a result of the halftone process. Here, the correspondence relationship between each position in a minimal repetition unit of a nozzle pattern indicating a nozzle out of the plurality of nozzles that is used to form a dot in each position on the printing medium and each threshold value of the dither mask that is applied to the each position is set to be constant. The dither mask includes at least one side of nozzles that are disposed on both ends of the nozzle row or frontmost-end nozzles that serve as nozzles disposed on both ends of the nozzle row in a print area having a predetermined range of an ink duty ratio. In addition, the plurality of threshold values are set such that a use ratio of front-end nozzles that is a ratio at which the front-end nozzles, which are disposed within a predetermined width from the at least one side of the frontmost-end nozzles, eject ink is lower than a use ratio of middle nozzles that is a ratio at which middle nozzles, which are acquired by excluding the front-end nozzles from the plurality of nozzles, eject ink.

According to the printing apparatus having the above-described configuration, the correspondence relationship between each position in a minimal repetition unit of a nozzle pattern and each threshold value of the dither mask that is applied to each position is set to be constant. Accordingly, the easiness of dot formation can be controlled in units of nozzles. Here, the threshold values of the dither mask are set such that the use ratio of the front-end nozzles is lower than that of the middle nozzles for a predetermined range of the ink duty ratio. Accordingly, it is difficult for a dot to be formed in front-end dot forming positions, in which uneven density occurs, located on the periphery of a dot forming position in which a dot is formed by the frontmost-end nozzle. Therefore, on the periphery of the dot forming position in which a dot is formed by the frontmost-end nozzle, a distance between dots of which formation timings are different can be increased, or the number of dots for which the formation timings change can be decreased. As a result, the degradation of the printing image quality can be suppressed by allowing uneven density to be visually indistinct. In addition, since only the configuration of the dither mask is considered, any special device is not needed, whereby the general versatility of the apparatus is high. Here, a predetermined width described in claims includes a case where the width is zero. In such a case, the frontmost-end nozzle is the same as the front-end nozzle.

Application 2

In the printing apparatus according to Application 1, a use ratio of the frontmost-end nozzles is the lowest of the use ratios of the front-end nozzles.

According to the printing apparatus having the above-described configuration, for a predetermined range of the ink duty ratio, it is the most difficult for a dot to be formed in a dot forming position in which a dot is formed by the frontmost-end nozzle and uneven density occurs. Accordingly, the uneven density can be visually indistinct in an effective manner.

Application 3

In the printing apparatus according to Application 2, the use ratio of each of the front-end nozzles is lower as the each of the front-end nozzles is aligned in a position closer to the frontmost-end nozzle.

According to the printing apparatus having the above-described configuration, for a predetermined range of the ink duty ratio, it is more difficult for a dot to be formed in a dot forming position that is closer to a dot forming position, in which a dot is formed by the frontmost-end nozzle, out of dot forming positions in which dots are formed by the front-end nozzles. Accordingly, changes in the densities of dots can be visually soft by gradually changing the number of dots having different formation timings, whereby the advantage that the uneven density is not visually distinct can be improved.

Application 4

In the printing apparatus according to Application 1, the dither mask is applied to front-end dot forming positions in which a dot is formed by the front-end nozzle, and at least some of the threshold values of the dither mask are set as a dot suppressing threshold value for which a priority level for dot formation is lower than those of threshold values other than the at least some of the threshold values.

According to the printing apparatus having the above-described configuration, it is more difficult for a dot to be formed in a dot forming position to which the dot suppressing threshold value is applied than in other dot forming positions. Accordingly, the advantages of Application 1 can be acquired in a print area having a broad range of the ink duty ratio.

Application 5

In the printing apparatus according to Application 4, the number of the dot suppressing threshold values of the dither mask is the largest in a frontmost-end threshold row, applied to the frontmost-end dot forming positions in which a dot is formed by the frontmost-end nozzle, out of threshold rows in which threshold values applied to the front-end dot forming positions are aligned in the main scanning direction.

According to the printing apparatus having the above-described configuration, the advantages of Application 2 can be acquired in a print area having a broad range of the ink duty ratio.

Application 6

In the printing apparatus according to Application 5, the number of the dot suppressing threshold values of the dither mask is larger in a threshold row as the threshold row is closer to the frontmost-end threshold row.

According to the printing apparatus having the above-described configuration, the advantages of Application 3 can be acquired in a print area having a broad range of the ink duty ratio.

Application 7

In the printing apparatus according to any one of Applications 1 to 6, the size of the dither mask in the sub scanning direction is a positive integral multiple of the minimal repetition unit of the nozzle pattern.

Application 8

In the printing apparatus according to any one of Application 7, the size of the dither mask in the main scanning direction is a positive integral multiple of the minimal repetition unit of the nozzle pattern.

According to the printing apparatus having the above-described configuration, a halftone process is performed by using the dither mask having the size of a positive integral multiple of the minimal repetition unit of the nozzle pattern. Accordingly, the correspondence relationship between each position in a minimal repetition unit of a nozzle pattern and each threshold value of the dither mask that is applied to each position can be set to be constant in an easy manner.

In addition, the invention may be implemented as a dither mask according to Application 9 or a method of printing according to Application 10.

Application 9

There is provided a dither mask that is formed by a plurality of threshold values and is used for a halftone process for performing printing while relatively moving a print head in a main scanning direction and a sub scanning direction with respect to a printing medium. Here, the correspondence relationship between each position in a minimal repetition unit of a nozzle pattern indicating a nozzle out of a plurality of nozzles, which is installed on the print head so as to be aligned in the sub scanning direction and ejects ink, that is used to form a dot in each position on the printing medium and each threshold value of the dither mask that is applied to the each position is set to be constant. The dither mask includes at least one side of nozzles that are disposed on both ends of a nozzle row that is installed on the print head and is acquired by aligning a plurality of nozzles, which ejects ink, in the sub scanning direction or frontmost-end nozzles that serve as nozzles disposed on both ends of the nozzle row in a print area having a predetermined range of an ink duty ratio. In addition, the plurality of threshold values are set such that a use ratio of front-end nozzles that is a ratio at which the front-end nozzles, which are disposed within a predetermined width from the at least one side of the frontmost-end nozzles, eject ink is lower than a use ratio of middle nozzles that is a ratio at which middle nozzles, which are acquired by excluding the front-end nozzles from the plurality of nozzles, eject ink.

Application 10

There is provided a method of printing by using a printing apparatus that performs printing by controlling ejection of ink from each nozzle of a nozzle row that is installed on a print head and is acquired by aligning a plurality of nozzles, which ejects ink, in a sub scanning direction while relatively moving the print head in a main scanning direction and the sub scanning direction with respect to a printing medium. At least one side of nozzles that are disposed on both ends of the nozzle row or frontmost-end nozzles that serve as nozzles disposed on both ends of the nozzle row in a print area having a predetermined range of an ink duty ratio is included. The method includes: performing printing by controlling the ejection of ink such that a use ratio of front-end nozzles that is a ratio at which the front-end nozzles, which are disposed within a predetermined width from the at least one side of the frontmost-end nozzles, eject ink is lower than a use ratio of middle nozzles that is a ratio at which middle nozzles, which are acquired by excluding the front-end nozzles from the plurality of nozzles, eject ink.

BRIEF DESCRIPTION OF THE DRAWINGS

The invention will be described with reference to the accompanying drawings, wherein like numbers reference like elements.

FIGS. 4A to 4C are diagrams showing the appearance of forming dots by using the printer.

FIGS. 5A to 5C are diagrams showing the appearance of forming dots by using the printer.

FIG. 6 is an explanatory diagram showing the characteristics of threshold values of a dither mask.

FIG. 12 is an explanatory diagram showing the characteristics of threshold values of a dither mask as Modified Example 2.

FIGS. 15A to 15C are diagrams showing the appearance of forming dots by using a printer as Modified Example 5.

FIGS. 20A and 20B are explanatory diagrams showing a nozzle pattern as a second example of Modified Example 9.

DESCRIPTION OF EXEMPLARY EMBODIMENTS

A. Embodiment

Hereinafter, an embodiment of the invention will be described.

A-1. Apparatus Configuration

Figure 1:
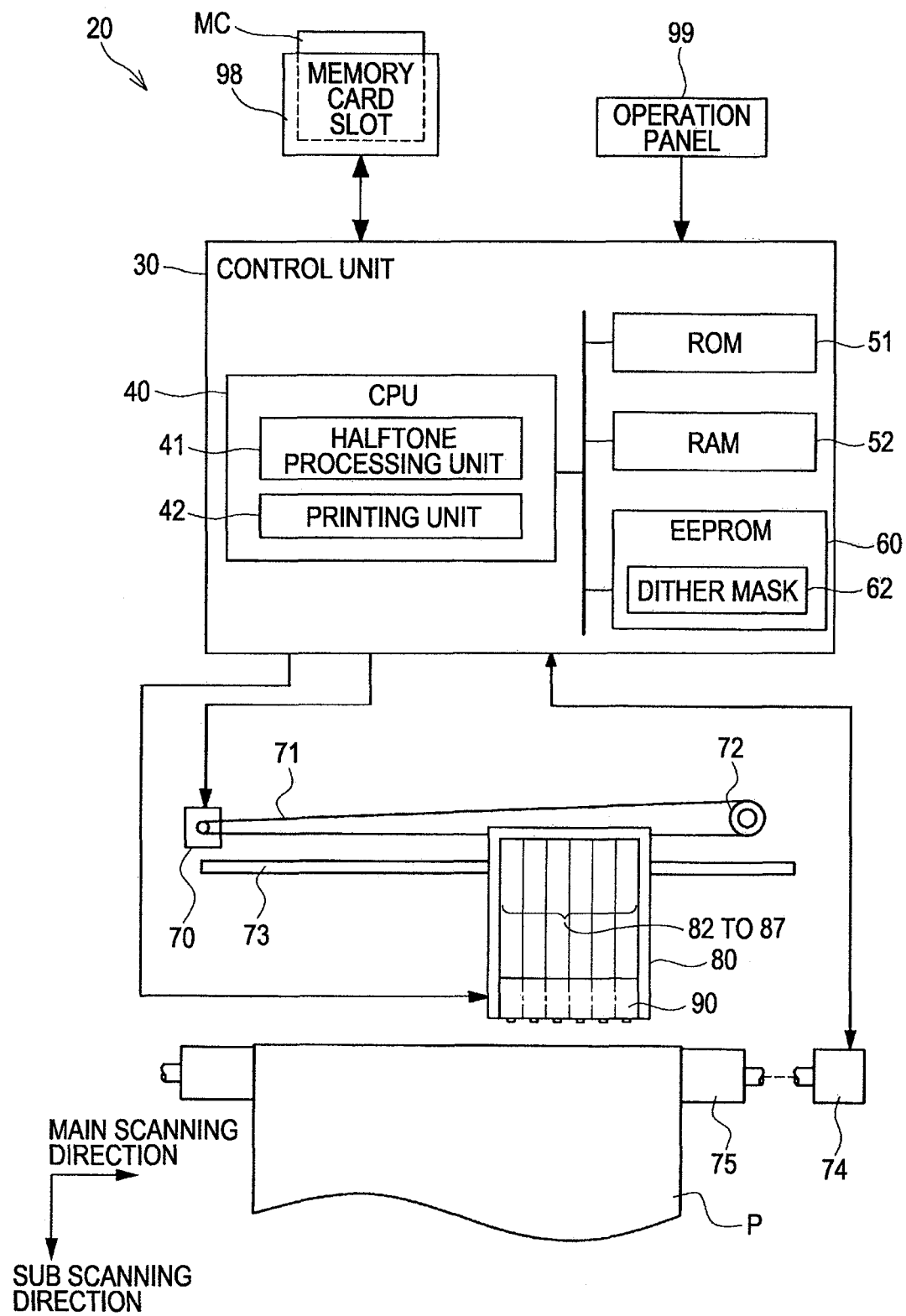
FIG. 1 is a schematic diagram showing the configuration of a printer according to an embodiment of the invention.

FIG. 1 is a schematic diagram showing the configuration of a printer 20 according to an embodiment of the invention. The printer 20 is a serial ink jet printer. The printer 20, as shown in the figure, is configured by a mechanism that transports a printing medium P by using a paper feed motor 74, a mechanism that reciprocates a carriage 80 in the shaft direction of a platen 75 by using a carriage motor 70, a mechanism that performs ink ejection and dot formation by driving a print head 90 that is mounted on the carriage 80, and a control unit 30 that is responsible for exchanging signals among the paper feed motor 74, the carriage motor 70, the print head 90, and an operation panel 99.

The mechanism that reciprocates the carriage 80 in the shaft direction of the platen 75 is configured by a sliding shaft 73 that is installed to be parallel to the shaft of the platen 75 and holds the carriage 80 so as to be able to slide, a pulley 72 to which an endless driving belt 71 extending from the carriage motor 70 is installed, and the like.

On the carriage 80, ink cartridges 82 to 87 for color ink that house cyan ink C, magenta ink M, yellow ink Y, black ink K, light cyan ink Lc, and light magenta ink Lm as color ink are mounted. In the print head 90 that is located in the lower portion of the carriage 80, nozzle rows corresponding to color ink of the above-described colors are formed. When such ink cartridges 82 to 87 are installed on the carriage 80 from the upper side, ink can be supplied from each cartridge to the print head 90.

The control unit 30 is configured by a CPU 40, a ROM 51, a RAM 52, and an EEPROM 60 that are interconnected through a bus. The control unit 30 controls the overall operation of the printer 20 by expanding a program stored in the ROM 51 or the EEPROM 60 into the RAM 52 and executing the program. In addition, the control unit 30 also serves as a halftone processing unit 41 and a printing unit 42. The functional units will be described in detail later.

In the EEPROM 60, a dither mask 62 is stored. The dither mask 62 is used for a halftone process using an ordered dither method. In this embodiment, the dither mask 62 has so-called a blue noise characteristic.

To the control unit 30, a memory card slot 98 is connected. Thus, the control unit 30 reads in image data ORG to be input from a memory card MC that is inserted into the memory card slot 98. In this embodiment, the image data ORG input from the memory card MC is data that is configured by color components of three colors including red (R), green (G), and blue (B).

The printer 20 having the above-described hardware configuration reciprocates the print head 90 in the main scanning direction with respect to the printing medium P by driving the carriage motor 70 and moves the printing medium P in the sub scanning direction by driving the paper feed motor 74. The control unit 30 forms ink dots of appropriate colors in appropriate positions on the printing medium P by driving the nozzles at appropriate timings based on the print data in accordance with reciprocating movement (main scanning) of the carriage 80 and transporting movement (sub scanning) of a printing medium. Accordingly, the printer 20 can print a color image, which is input from the memory card MC, on the printing medium P.

Figure 2:
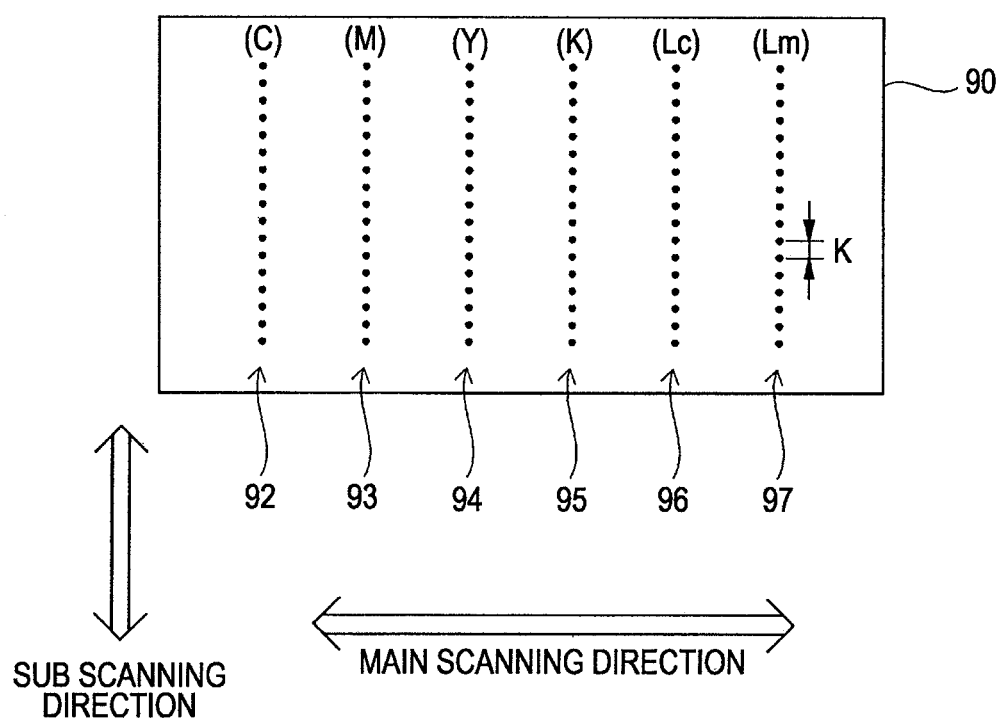
FIG. 2 is an explanatory diagram showing nozzle disposition of a print head.

The above-described print head 90 is shown in detail in FIG. 2. This figure schematically shows the bottom face (a face facing the printing medium P) of the print head 90. As shown in the figure, the print head 90 has nozzle rows 92 to 97 that are formed by aligning a plurality of nozzles in the sub scanning direction. In this embodiment, each nozzle row is formed by 30 nozzles arranged at the nozzle pitch of K. These nozzle rows 92 to 97 correspond to the ink colors of the cartridges installed on the carriage 80 and eject cyan ink C, magenta ink M, yellow ink Y, black ink K, light cyan ink Lc, and light magenta ink Lm, respectively. In addition, in this embodiment, the nozzle row corresponding to each ink color is configured by aligning rows in one row. However, the disposition of nozzles of one nozzle row is not particularly limited. Thus, nozzles of one ink color may be aligned in a plurality of rows. Furthermore, the nozzles aligned in the plurality of rows may be configured to form a zigzag pattern.

A-2. Printing Process

Figure 3:
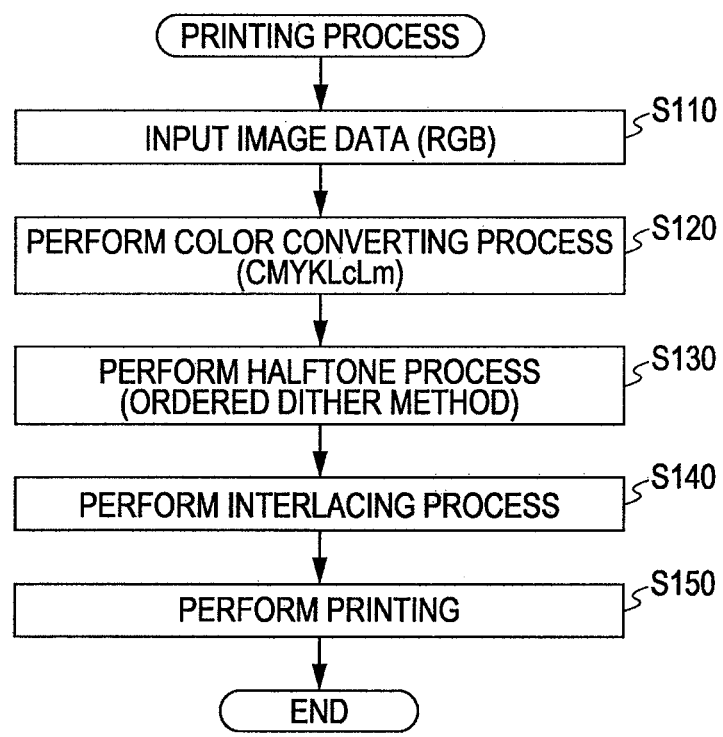
FIG. 3 is a flowchart of a printing process performed by the printer.

Hereinafter, a printing process of the printer 20 will be described. FIG. 3 is a flowchart of a printing process according to this embodiment. The printing process described here is started as a user performs a print directing operation for a predetermined image stored in the memory card MC by using the operation panel 99 or the like. When the printing process is started, the CPU 40, first, reads in the image data ORG to be input in an RGB format as a printing target from the memory card MC through the memory card slot 98 (Step S110).

When the image data ORG is input, the CPU 40 converts the image data ORG in colors from the RGB format to a CMYKLcLm format by referring to a lookup table (not shown) that is stored in the EEPROM 60 (Step S120).

When the color conversion is performed, the CPU 40 performs a halftone process for converting the image data into ON or OFF data of color dots by using a dither mask 62 in accordance with an ordered dither method as a process of the halftone processing unit 41 (Step S130). The ordered dither method is known technology, and thus, a detailed description is omitted here. In brief, a record ratio corresponding to gray scale data of a focused pixel and a threshold value within a dither mask corresponding to the position of the focused pixel are compared to each other, and it is determined that a dot is formed in the pixel for a case where the record ratio is higher than the threshold value and that a dot is not formed for a case where the record ratio is lower than the threshold value. The dither mask 62 used here will be described in detail later. In addition, the halftone process is not limited to a process for acquiring a binary value of ON or OFF for each dot. Thus, the halftone process may be a process for acquiring multi-values such as ON or OFF of a large dot and ON or OFF of a small dot.

When the halftone process is performed, the CPU 40 performs an interlacing process in which the row for dot pattern data to be developed is changed for each time when the main scanning is performed in accordance with the nozzle disposition of the printer 20, the paper transport amount, and the like (Step S140). When the interlacing process is performed, the CPU 40 performs printing by driving the print head 90, the carriage motor 70, the paper feed motor 74, and the like as a process of the printing unit 42 (Step S150).

A-3. Characteristics of Nozzle Pattern

According to the printer 20 of this embodiment, periodicity appears in a nozzle pattern that indicates a nozzle out of a plurality of nozzles included in the print head 90 is for forming a dot of each position on a printing medium P. Hereinafter, such periodicity will be described.

In this embodiment, in the above-described printing process, as a form of driving control for the print head 90 and the like, the number of overlaps is "2", the nozzle pitch is "2", and the paper transport amount is "15". In addition, two-way printing in which ink is ejected in both the forward movement and the backward movement of the print head 90 is performed. The number of overlaps represents the number of times of the main scanning that is needed for filling in one raster formed in the main scanning direction (horizontal direction) with dots. In other words, in a case where the number of overlaps is "2", one raster formed in the main scanning direction is completed by performing the main scanning twice. In addition, the nozzle pitch is the number of dots between centers of nozzles that are adjacent to each other in the sub scanning direction and represents a number acquired by adding one to the number of rasters (dots) placed between two nozzles that are adjacent to each other. In this embodiment, since the nozzle pitch is "2", dots are formed at the interval of one raster by performing the main scanning once by using the print head 90. In addition, the paper transport amount represents the amount (the number of rasters) of transport of the print head 90 in the sub scanning direction acquired by performing the main scanning once. In this embodiment, the paper transport amount is "15", that is, an odd number. Accordingly, between the dots formerly formed at the interval of one raster, new dots are formed by performing the next main scanning.

FIGS. 4A to 4C and 5A to 5C are diagrams showing the appearance of forming dots by using the printer 20. Although FIGS. 4A to 4C and FIGS. 5A to 5C represent one continuous diagram, due to the size of a paper sheet, the diagram is represented to be divided into two parts of FIGS. 4A to 4C and FIGS. 5A to 5C. Here, the appearance of dots formed by the nozzle row 92 is described representatively. However, the same applies to other nozzle rows. In FIGS. 4A and 5A, the appearance of moving the nozzle row 92 in the sub scanning direction at each time of the main scanning is shown. The nozzles are denoted by numbers from "0" to "29" for convenience of description. Here, the nozzles that are disposed on both ends of each nozzle row, that is, nozzles having the numbers of "0" and "29" are referred to as the frontmost end nozzles. As shown in the figures, in this embodiment, since the paper transport amount is "15", the print head 90 moves by 15 rasters in the sub scanning direction for each main scanning. In addition, the nozzle position (the main scanning direction) shown in the figure corresponds to a position of a main scanning number (see a table located on the upper side of FIG. 4A) that relatively represents the time of the main scanning. For example, the position of the nozzle row shown on the left-most side corresponds to the scanning number of "−3". In addition, the main scanning number is denoted by a relative number by using the fourth main scanning shown in the figure as a reference (the "0"-th main scanning).

In FIGS. 4B and 5B, at which time of the main scanning a dot formed on the printing medium is formed is denoted by using the main scanning number. The lattices shown in FIGS. 4B and 5B represent odd dots and even dots of each raster, and a number inside each lattice corresponds to the main scanning number shown on the upper portion in FIGS. 4A and 5A. In other words, as shown in FIGS. 4B and 5B, in the raster located on the uppermost side, odd dots are formed by the 0-th main scanning, and the even dots are formed by (−2)-th main scanning.

As shown in FIGS. 4B and 5B, in this embodiment, when focused on a 2×2 local area (hereinafter, referred to as a local area), the scanning numbers for two rasters located on the uppermost side are "0", "−1", "−2", and "−3" in the order of the upper left side, the lower left side, the upper right side, and the lower right side. In other words, in these local areas, dots are filled in the order of the lower right side, the upper right side, the lower left side, and the upper left side. This order is referred to as "fill-in order". The size of the local area in the horizontal direction (the main scanning direction) is in accordance with the number of overlaps (in this embodiment, "2"), and the size of the local area in the vertical direction (the sub scanning direction) is in accordance with the nozzle pitch (in this embodiment, "2"). In FIGS. 4B and 5B, lattices are represented to be delimited by a solid line for each local area. The fill-in order has a property that the fill-in order is changed in a dot forming position in which dots are formed by the frontmost-end nozzles (nozzle numbers 0 and 29) for each time when the print head 90 moves in the sub scanning direction (that is, each time when the main scanning is performed). Accordingly, in this embodiment, when being changed four times, the fill-in order returns to the original fill-in order. The number of repetition units of the fill-in order is a multiplication of the nozzle pitch by the number of overlaps. In FIGS. 4B and 5B, each main scanning number in a position in which the fill-in order is changed is denoted by being inverted. The setting of such fill-in order is performed in Step S140 of the above-described printing process.

FIGS. 4C and 5C show a nozzle pattern that indicates which nozzle forms a dot in each dot position located on the printing medium. A number inside each lattice corresponds to a nozzle number shown in FIGS. 4A and 5A. In addition, for convenience of description, a dot column number is shown in the upper end of the figures, and a dot row number is shown in the left end of the figures. By referring to FIGS. 4C and 5C and FIGS. 4B and 5B together, it can be noticed that, in the raster located in the uppermost part in the figures, odd dots are formed by the 0-th nozzle in the 0-th main scanning, and the even dots are formed by 15th nozzle in the (−2)-th main scanning. In addition, it can be noticed that, in the 2nd raster, the odd dots are formed by the 8th nozzle in the (−1)-th main scanning, and even dots are formed by 23rd nozzle in the (−3)-th main scanning.

In such a nozzle pattern, in a same raster (in the main scanning direction), the dot forming positions of the odd columns and the even columns respectively correspond to a same nozzle number. In addition, in the sub scanning direction, repetition of nozzle numbers occurs in units each configured by the 1st to 60th rows. In other words, the nozzle pattern of the printer 20 is configured by repetition of a minimal repetition unit RU that is configured by the 1st to 2nd columns and the 1st to 60th rows in the main scanning direction and the sub scanning direction. Such a periodicity in the nozzle pattern relates to the above-described repetition of the fill-in order. Accordingly, in the main scanning direction, repetition in units of the number of overlaps occurs, and, in the sub scanning direction, repetition occurs in units of a multiplication of the paper transport amount by the fill-in order.

In addition, in such a nozzle pattern, in a position in which the fill-in order is changed, that is, a dot forming position in which a dot is formed by the frontmost end nozzle, the main scanning numbers are changed simultaneously in units of even columns or odd columns in the sub scanning direction. For example, in even columns of the 10th column, the 12th column, and the 14th column, dots are formed by nozzles having nozzle numbers of 27, 28 and 29 in the (−3rd) main scanning, and in even columns of the 16th column, the 18th column, and the 20th column, dots are formed by nozzles having nozzle numbers of 0, 1, and 2 in the 1st main scanning. In other words, in the 14th column and the 16th column, the main scanning numbers are simultaneously changed for all the even columns. As described above, the position in which a dot is formed by the frontmost end nozzle and the main scanning number for forming a corresponding dot in the sub scanning direction is changed is referred to as a frontmost-end dot forming position in the descriptions here. The frontmost-end dot forming positions are dot forming positions denoted by being hatched in FIGS. 4C and 5C.

As described above, when the main scanning numbers are simultaneously changed for all the even columns or all the odd columns, there is a high possibility that the dot landing positions are deviated due to a difference in the main scanning numbers, and easiness in ink bleed changes due to a difference in the dot forming timings. Accordingly, uneven density between frontmost-end dot forming positions becomes visually distinct, whereby degradation of the printing image quality occurs.

A-4. Nozzle Pattern Control by Using Dither Mask

According to an embodiment of the invention, the degradation of the printing image quality due to the above-described nozzle pattern characteristics is suppressed, and the principle thereof will be described as below. The size of the dither mask 62, which is used in the halftone process (see Step S130 shown in FIG. 3) of the printer 20, in the main scanning direction and the sub scanning direction is a positive integral multiple of the minimal repetition unit RU of the above-described nozzle pattern. In this embodiment, the dither mask 62 is configured to have a size that is six times the minimal repetition unit RU in the main scanning direction and the same as the size of the minimal repetition unit RU in the sub scanning direction, that is, a size for which ON or OFF of dots for the dot forming positions located in the 1st column to 12th column and in the 1st row to the 60th row can be determined.

By configuring the size of the dither mask 62 as such, the correspondence relationship between each dot forming position in the minimal repetition unit RU and the threshold value of the dither mask 62 that is applied to determination of ON or OFF of a dot located in the position can be set to be constant in an easy manner. Accordingly, the nozzle pattern has a periodicity of the minimal repetition unit RU. Thus, the easiness in dot formation for each nozzle can be controlled by setting the threshold value of the dither mask 62. However, the size of the dither mask 62 is not limited to a positive integral multiple of the minimal repetition unit RU of the nozzle pattern. The size of the dither mask 62 may be a size for which the correspondence relationship between each dot forming position in the minimal repetition unit RU and a threshold value of the dither mask 62 that is applied to determination of ON or OFF of a dot located in the position can be set to be constant. For example, out of the nozzle patterns shown in FIGS. 4C and 5C, the nozzle pattern formed in the 1st row and the 1st column to the 30th row and the 2nd column corresponding to a half of the minimal repetition unit RU of the nozzle pattern is the same as the nozzle pattern formed in the 31st row and the 2nd column to the 60th row and the 3rd column. Thus, in a case where the dither mask is shifted by one column for each dot forming position and is applied to be disposed in the sub scanning direction, the size of the dither mask 62 in the sub scanning direction may be configured to be half the minimal repetition unit RU of the nozzle pattern.

Figure 6:
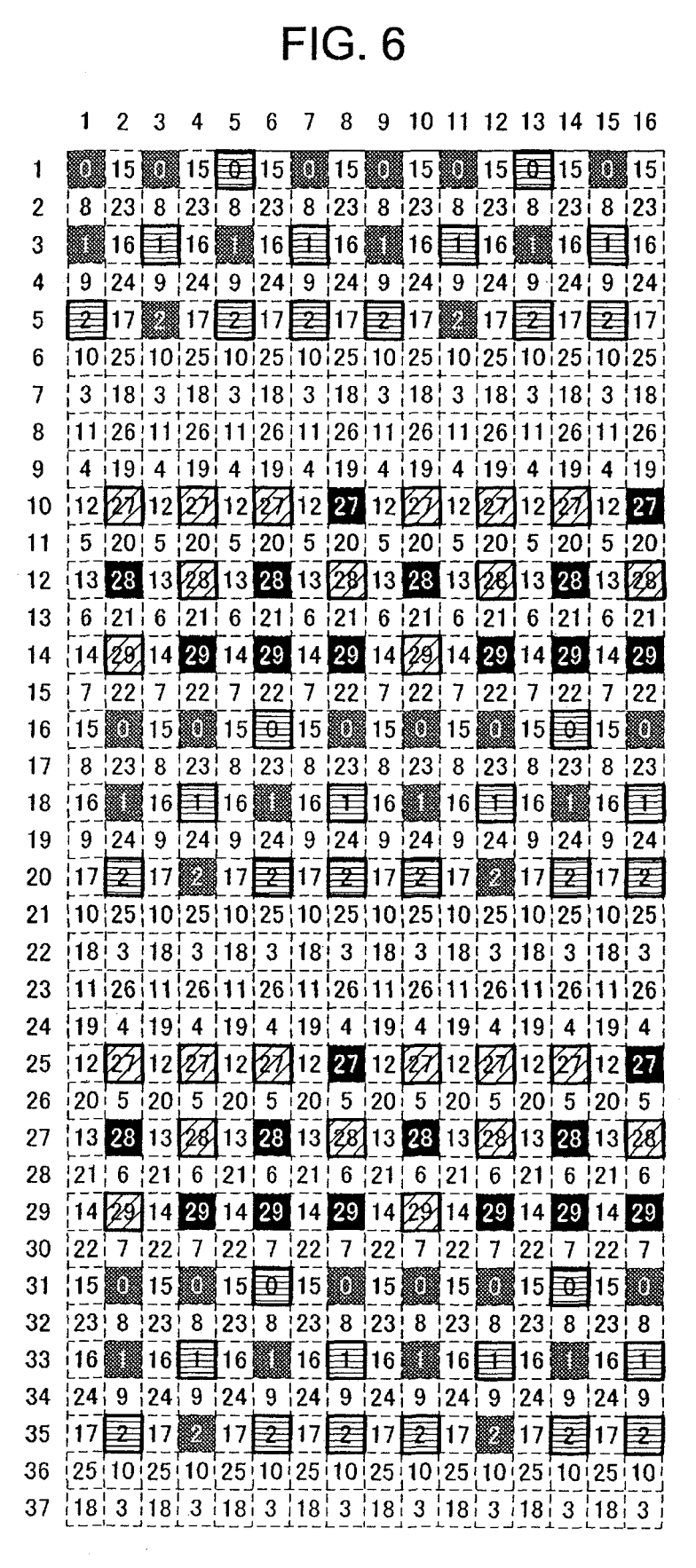
Figures 7, 8:
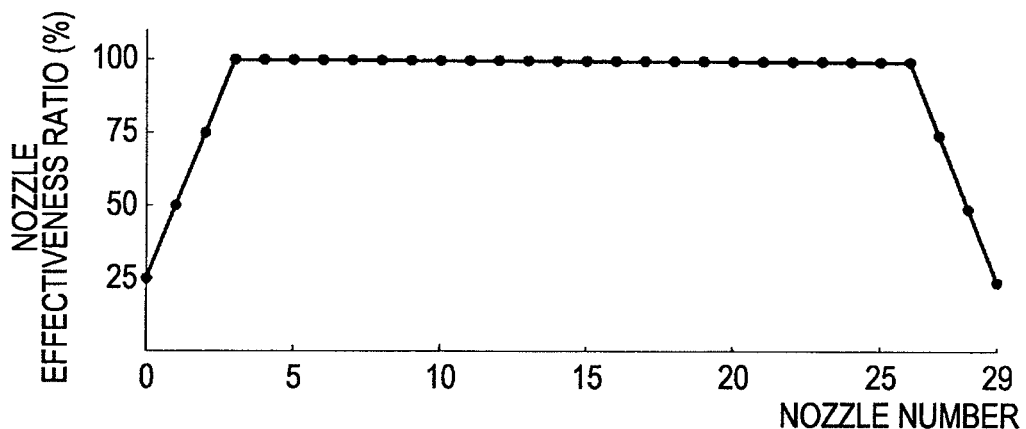
FIG. 7 is an explanatory diagram showing the characteristics of threshold values of a dither mask.
FIG. 8 is an explanatory diagram showing a nozzle effectiveness ratio for each nozzle in a case where the dither mask is used.

The characteristics of the threshold values of the dither mask 62 having such a size will be descried with reference to FIGS. 6 and 7. FIGS. 6 and 7 show a nozzle pattern of dot forming positions corresponding to the size of the dither mask 62. In the dither mask 62, the threshold values applied to the positions, which are represented by nozzle numbers that are denoted b being inverted, of the dot forming positions shown in the figure are set to have a priority level lower than those applied to other positions, that is, to be relatively large. In the descriptions here, such a relatively large threshold value is referred to as a dot suppressing threshold value.

The dot forming position to which the dot suppressing threshold value is applied is set out of the dot forming positions that are formed by a nozzle within a predetermined width from the frontmost-end nozzle. In the descriptions here, the nozzle that is within the predetermined width from the frontmost-end nozzle is also referred to as a front-end nozzle, and a dot forming position in which a dot is formed by the front-end nozzle is also referred to as a front-end dot forming position. In this embodiment, the predetermined width is two nozzles from the frontmost-end nozzle (nozzle number of "0" or "29"). In other words, the front-end nozzles are nozzles having nozzle numbers of "0", "1", "2", "29", "28", and "27".

In addition, in the dither mask 62 of this embodiment, the number of the dot suppressing threshold values is gradually changed such that the number of threshold values set as the dot suppressing threshold values is increased as the threshold values are applied to the front-end dot forming positions closer to the frontmost dot forming position in the sub scanning direction. In particular, for example, for the threshold values applied to even columns of the 14th row and even columns of the 16th row which are the frontmost-end dot forming positions, the number of the dot suppressing threshold values is six. In addition, for the threshold values applied to even columns of the 12th row and even columns of the 18th row which are apart from the frontmost-end dot forming position by two rasters (one nozzle) in the sub scanning direction, the number of the dot suppressing threshold values is four. In addition, for the threshold values applied to even columns of the 10th row and even columns of the 20th row which are apart from the frontmost-end dot forming position by four rasters (two nozzles), the number of the dot suppressing threshold values is two. Also for other frontmost dot forming positions, the dot suppressing threshold values are set in the same manner, and a total number of the dot suppressing threshold values becomes 96.

In addition, the above-described dither mask 62 can be created as follows. First, the threshold values of the dither mask are optimally disposed by excluding the dot forming positions to which the dot suppressing threshold values are applied. Then, the threshold values are optimally disposed for the dot forming positions to which the dot suppressing threshold values are applied by using the threshold values (dot suppressing threshold values) for which the priority level for dot formation is lower than that of the corresponding dot forming position. For example, in a case where the threshold value of the dither mask 62 has a value in the range of "1" to "960", the number of the dot suppressing threshold values is 96. Accordingly, 864 threshold values from "1" to "864" excluding the dot suppressing threshold value are optically disposed in the dot forming positions except for the positions to which the dot suppressing threshold values are set. Then, 96 dot suppressing threshold values from "865" to "960" are optimally disposed in the dot forming positions to which the dot suppressing threshold values are set. In addition, as an optimization method for the disposition of the threshold values, various methods have been known. Thus, a description thereof is omitted here. For example, a method in which the disposition of the threshold values are sequentially determined from a smallest threshold value based on a predetermined evaluation value of the graininess may be used.

When such characteristics of the dither mask 62 are represented by a nozzle effectiveness ratio that is a ratio of the number of the dot forming positions expected for the positions, to which the dot suppressing threshold value is applied, to the number of all the dot forming positions for each nozzle number, the result is as shown in FIG. 8. In other words, the nozzle, which is set as the front-end nozzle, having the nozzle number of 0 to 2 or 27 to 29 has a lower nozzle effectiveness ratio as the nozzle is closer to the front end of the nozzle row, that is, the nozzle forms a dot in a position closer to the frontmost-end dot forming position in the sub scanning direction.

When the halftone process is performed by using such a dither mask 62, it is more difficult for a dot to be formed in the front-end dot forming position as the front-end dot forming position is closer to the frontmost-end dot forming position. In particular, in a case where printing in which an ink duty ratio is equal to or less than 90% (864/960) is performed, any dot is not formed in the dot forming position to which the dot suppressing threshold value is applied, whereby the advantage thereof is prominent. In addition, the nozzle effectiveness ratio shown in FIG. 8 is identical to the use ratio of the nozzles that is an ink ejection ratio of the nozzles for the case of 90% ink duty ratio.

The printer 20 having such a configuration performs a halftone process by using the ordered dither method using the dither mask 62 having the size of a positive integral multiple of the minimal repetition unit RU of the nozzle pattern. Accordingly, the correspondence relationship between the dot forming position in the minimal repetition unit RU and the threshold value of the dither mask 62 that is applied to determination of ON or OFF of a dot located in the position can be set to be constant. In other words, the easiness in dot formation can be controlled for each nozzle by setting the threshold value of the dither mask 62. In addition, for the printer 20, the dither mask 62 is set such that the number of the dot suppressing threshold values is increased toward the frontmost-end dot forming position on the periphery of the frontmost-end dot forming position, that is, in the front-end dot forming positions in which uneven density occurs. Accordingly, in the front-end dot forming position, it becomes necessarily more difficult for a dot to be generated toward the frontmost-end dot forming position. In particular, in a case where the duty ratio of ink is equal to or less than an average value of the nozzle effectiveness ratios of the nozzles, in the front-end dot forming positions, necessarily, the number of formed dots is decreased toward the frontmost-end dot forming position.

Accordingly, on the periphery of the frontmost-end dot forming position in which uneven density occurs, a change in the densities of dots can be set to be visually soft. As a result, the uneven density can be visually unrecognizable, and accordingly, degradation of the printing image quality can be suppressed.

Figure 9A:
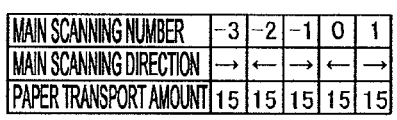
FIGS. 9A and 9B are explanatory diagrams showing a nozzle pattern of a printer using redundant nozzles.

A printing process that allows the uneven density to be visually unrecognizable may be implemented by arranging a redundant nozzle in the end portion of the nozzle row and gradually changing the use ratio of the redundant nozzle. A concrete example thereof will be described with reference to FIGS. 9A and 9B. The nozzle row shown in FIG. 9A, compared to the nozzle row shown in FIG. 4A, redundant nozzles having nozzle numbers of "−3" to "−1" are additionally included in the end portion on the side of the nozzle having the nozzle number of "0". Such redundant nozzles are nozzles that substitute a part of the function of the nozzles having the nozzle numbers of 27 to 29.

Figure 9B:
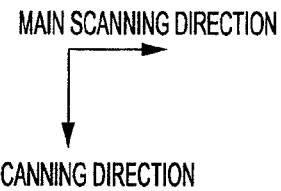

An example of the substitution by the redundant nozzles is shown in FIG. 9B. In this example, for even columns of the 10th, 12th, and 14th rows, dots can be formed by the nozzles having the nozzle numbers of 27, 28 and 29. However, in some of such dot forming positions, dots are foamed by the redundant nozzles having the nozzle numbers of −3 to −1. In FIG. 9B, in the dot forming positions in which dot formation is performed by substituted redundant nozzles, the nozzle numbers are denoted by being inverted. As shown in the figure, the use ratio of the redundant nozzles for each raster is changed so as to gradually increase from the 10th row to the 14th row. Accordingly, in one raster, the ratio of dots formed by the (−3)-th main scanning to dots formed by the 1st main scanning is gradually changed in the sub scanning direction. As a result, the change in the densities of dots can be visually recognized to be soft, and thereby uneven density can be visually unrecognized.

In the above-described printer 20 according to an embodiment of the invention, such redundant nozzles are not needed for suppressing the degradation of the printing image quality. Accordingly, the apparatus configuration can be simplified. In addition, the printer 20 can suppress the degradation of the printing image quality due to uneven density only by performing a halftone process by using the above-described dither mask 62. Accordingly, general versatility of the printer 10 is high in a manufacturing process. Furthermore, the invention may be applied to existing serial ink jet printers by installing the dither mask 62 thereto.

B. MODIFIED EXAMPLES

Hereinafter, modified examples of the above-described embodiment will be described.

B-1. Modified Example 1

Figures 10, 11:
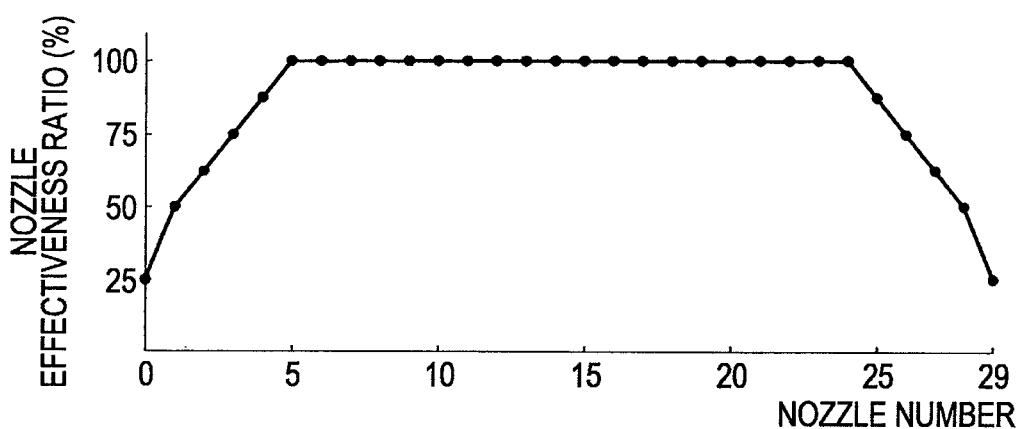
FIG. 10 is an explanatory diagram showing the characteristics of threshold values of a dither mask as Modified Example 1.
FIG. 11 is an explanatory diagram showing the nozzle effectiveness ratio for each nozzle in a case where the dither mask as Modified Example 1 is used.

In the above-described embodiment, the front-end nozzles that form dots in the front-end dot forming positions to which the dot suppressing threshold value out of the threshold values of the dither mask 62 is applied are set to nozzles corresponding to two nozzles from the frontmost-end nozzle (see FIGS. 6 and 7). However, the predetermined width used for setting the front-end nozzles may be arbitrarily set. For example, the predetermined width may be 0 (in other words, the front-end nozzle is the same as the frontmost-end nozzle) or may correspond to four nozzles. In FIG. 10, the characteristics of the dither mask 62 is shown for a case where the above-described predetermined width is configured to correspond to four nozzles by using a part of the nozzle pattern shown in FIGS. 4A to 4C and FIGS. 5A to 5C. In this example, as in FIGS. 6 and 7, the dot forming positions to which the dot suppressing threshold value is applied are denoted by inverted nozzle numbers.

As shown in the figure, the dither mask 62 according to a modified example is set such that the number of the dot suppressing threshold values slowly decreases from even columns of the 14th row and even columns of the 16th row which are the frontmost-end dot forming positions toward even columns of the 6th row and even columns of the 24th row which are separated from the frontmost-end dot forming positions by 8 rasters. When this is represented by the nozzle effectiveness ratio, the result is as shown in FIG. 11. It can be noticed that the nozzle effectiveness ratio changes softer than that of the case according to the above-described embodiment shown in FIG. 8.

As described above, when the predetermined width used for setting the front-end nozzles is increased, the changes in the nozzle effectiveness ratios can be set to be softer. Accordingly, the changes in the densities of dots can be set to be visually soft on the periphery of the frontmost-end dot forming position in which uneven density occurs. Therefore, the advantage that the uneven density is not visually distinct can be improved.

B-2. Modified Example 2

Figure 12:
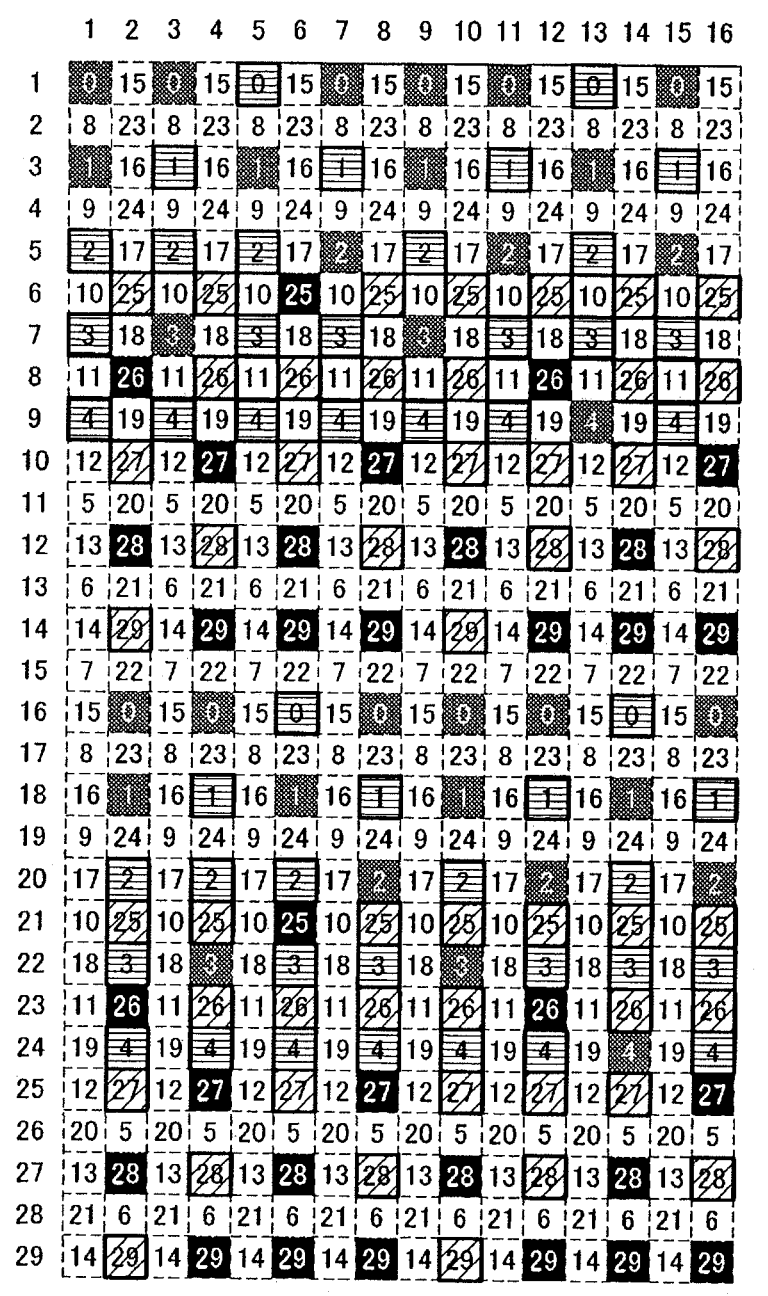

In the above-described embodiment, a configuration in which an area, in which the dot suppressing threshold value is set, in the dot forming position for the upper-end nozzle (the nozzle on the side of the nozzle number of "0") and an area, in which the dot suppressing threshold value is set, in the dot forming position for the lower-end nozzle (the nozzle on the side of the nozzle number of "29") do not overlap each other has been described. However, both the areas may be configured to overlap each other. In FIG. 12 an example in which the above-described both areas overlap each other in the 6-th to 9-th rows and the 21st to 24th rows. In such a case, the width in the sub scanning direction for which the dot suppressing threshold value is set can be increased. Accordingly, as in Modified Example 1, the advantage that the uneven density is not visually distinct can be improved.

B-3. Modified Example 3

Figure 13:
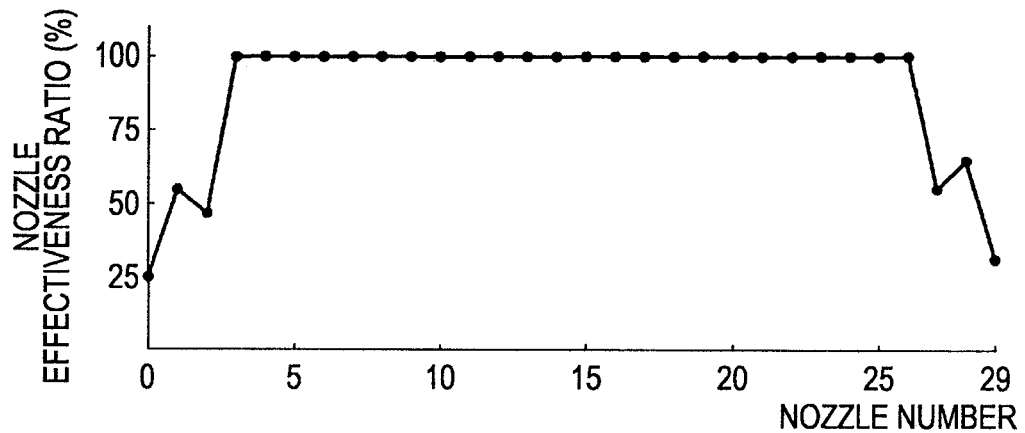
FIG. 13 is an explanatory diagram showing the nozzle effectiveness ratio for each nozzle in a case where a dither mask as Modified Example 3 is used.

In the above-described embodiment, as shown in FIGS. 8 and 11, a configuration in which the nozzle effectiveness ratio of a nozzle is lower as the nozzle forms a dot in a position closer to the frontmost-end dot forming position, that is, a configuration in which the nozzle effectiveness ratio gradually decreases toward the front-end portion of the nozzle row has been described. The reason for employing such a configuration is for increasing the advantage of allowing the uneven density to be visually indistinct by configuring the change in the densities of dots to be visually softer. However, the nozzle effectiveness ratio need not gradually decrease necessarily and may have a tendency to be lower toward the front end of the nozzle row as a whole. Alternatively, a configuration in which the nozzle effectiveness ratio is the lowest in the frontmost-end nozzle may be used. For example, as shown in FIG. 13, there may be a portion between the nozzle having the nozzle number of "4" and the nozzle having the nozzle number of "0" in which an increase or decrease is partially reversed. Even in such as case, the change in the densities of dots can be configured to be visually soft on the periphery of the frontmost-end dot forming position in which the uneven density occurs. As a result, the uneven density can be visually indistinct.

B-4. Modified Example 4

Figure 14A:
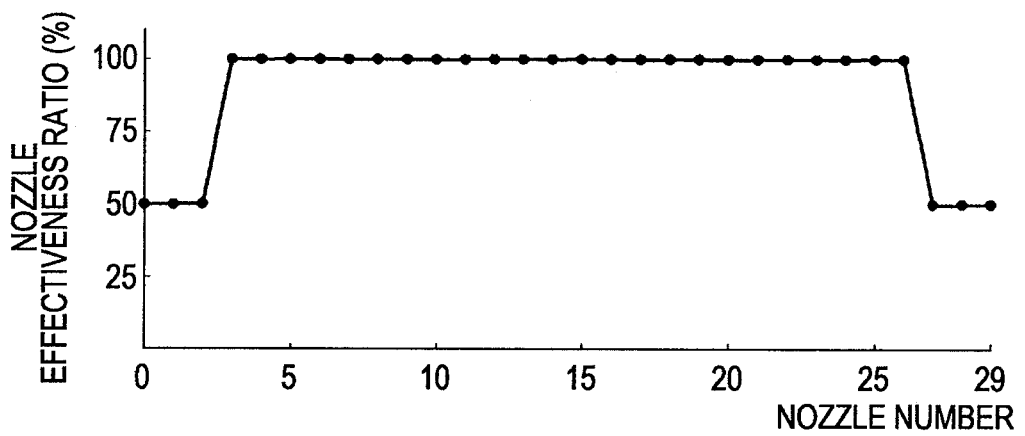
FIGS. 14A and 14B are explanatory diagrams showing the nozzle effectiveness ratio for each nozzle in a case where a dither mask as Modified Example 4 is used.

In the above-described embodiment, a configuration in which the nozzle effectiveness ratio is gradually changed for the front-end nozzles has been described. However, the nozzle effectiveness ratio of the front-end nozzles may be set to a fixed value. For example, as shown in FIG. 14A, the fixed value may be 50%. Even in such a case, the change in the densities of dots can visually decrease by decreasing the number of dots, in which the formation timings change, in the front-end dot forming positions. Accordingly, the advantage of allowing the uneven density to be visually indistinct can be expected.

Figure 14B:
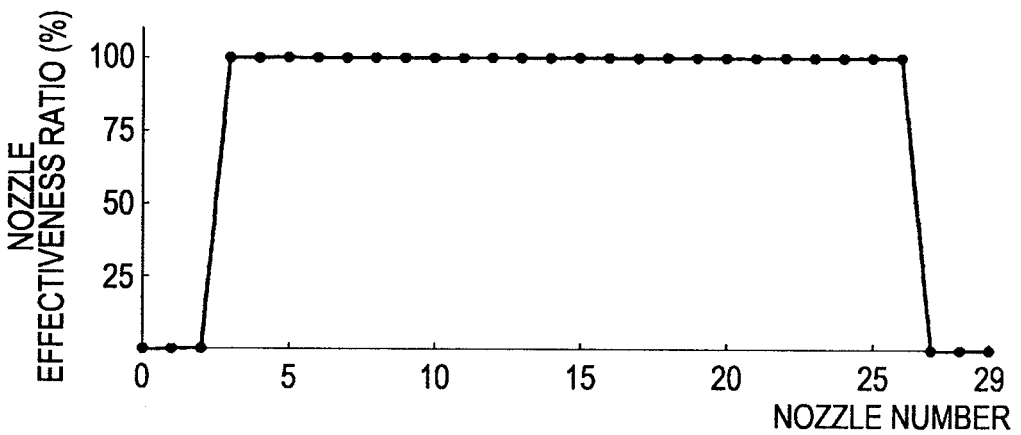

Alternatively, as shown in FIG. 14B, the fixed value may be 0%. In such a case, when the ink duty ratio is equal to or lower than the average value of the nozzle effectiveness rates of the nozzles, a distance between rasters that become boundaries for the change in the densities can be increased. For example, in the case shown in FIGS. 4A and 4B as an example, a distance between the 14-th row and the 16-th rows, which are the rasters that become boundaries for the change in the density, corresponds to one raster. However, when the nozzle effectiveness ratio is as shown in FIG. 14B, any dot is not formed in even columns of the 10th, 12th, 14th, 16th, 18th, 22nd columns. Thus, the rasters that become the boundaries for the change in the density are the 8th and 24th rows, and accordingly, the offset distance increases to correspond to 15 rasters. Therefore, the advantage of allowing the uneven density to be visually indistinct can be expected. In addition, in a case where the ink duty ratio is larger than the average value of the nozzle effectiveness rates of the nozzles, when the ink duty ratio is not 100%, the number of dots in which the formation timings change can be decreased in the front-end dot forming positions. Accordingly, the same advantages as those of the above-described embodiment can be acquired.

B-5. Modified Example 5

In the above-described embodiment, an example of the printer 20 in which the print head 90 relatively moves in the sub scanning direction with a same paper transport amount has been shown. However, the invention may be applied to a printer in which the paper transport amount is changed each time the main scanning is performed (referred to as unequally-spaced paper transport). FIGS. 15A to 15C are diagrams showing the appearance of dot formation performed by a printer 20 of the unequally-spaced paper transport type. Here, in the printer 20, as shown in FIG. 15A, the number of the nozzle rows is assumed to be "14". In addition, in the printer 20, as the aspect of driving control of the print head 90, the number of overlaps is "2", the nozzle pitch is "2", and the paper transport amount is repeated to be "7→6→7→8". The printer 20 is assumed to perform two-way printing in which ink is ejected both in the forward movement and the backward movement of the print head 90.

As shown in FIG. 15B, even for such a printer 20, as in the above-described embodiment, the fill-in order for the dot forming positions in which dots are formed by the frontmost-end nozzles is changed each time the print head 90 relatively moves in the sub scanning direction and returns to its original fill-in order. In addition, in the figure, the main scanning numbers in which the fill-in order is changed are denoted by being inverted.

Then, as shown in FIG. 15C, a nozzle pattern formed by repetition units RU each configured by the 1st to 2nd columns and the 1st to 28th rows can be noticed. Also in the nozzle pattern formed by the printer of the unequally-spaced paper transport type, repetition occurs in units of the number of overlaps in the main scanning direction, and repetition occurs in units of multiplication of an average amount of the paper transport amounts by the number of repetition units in the fill-in order in the sub scanning direction. Accordingly, even for the printer of the unequally-spaced paper transport type, when the dither mask 62 is configured to be the same as that of the above-described embodiment, the same advantages can be acquired.

B-6. Modified Example 6

In the above-described embodiment, the size of the dither mask 62 is described to be a positive integral multiple of the minimal repetition unit RU. However, it is preferable that the width of the dither mask in the main scanning direction is increased. When the width of the dither mask in the main scanning direction is increased, the number of the dot forming positions, to which the dot suppressing threshold value can be applied in the main scanning direction, out of the dot forming positions to which one dither mask is applied increases. For example, when the width of the dither mask 62 in the main scanning direction corresponds to two dots, only 0% or 100% can be taken as the nozzle effectiveness ratio of the front-end nozzle. However, when the width of the dither mask 62 in the sub scanning direction corresponds to four dots, 0%, 50%, or 100% may be taken as the nozzle effectiveness ratio of the front-end nozzle row. As described above, in such a case, the advantage of allowing the uneven density to be visually indistinct can be improved by configuring the change in the nozzle effectiveness ratio to be softer.

B-7. Modified Example 7

In the above-described embodiment, for both the upper-end nozzle (nozzle on the side of the nozzle number of "0") and the lower-end nozzle (nozzle on the side of the nozzle number "29") that are the frontmost-end nozzles, a configuration in which the dot suppressing threshold value is applied to the front-end dot forming positions in which dots are formed by the front-end nozzles disposed within a predetermined width from both the upper-end nozzle and the lower-end nozzle is used. However, the same configuration may be used for any one of the frontmost-end nozzles, that is, any one of the upper-end nozzle and the lower-end nozzle. Even in such a case, the uneven density can be allowed to be visually indistinct.

B-8. Modified Example 8

In the above-described embodiment, a configuration in which some threshold values, applied to the front-end dot forming positions, out of the threshold values of the dither mask 62 are larger than other threshold values, that is, it is difficult for a dot to be formed in the front-end dot forming positions than other dot forming positions has been described. However, the configuration of the dither mask 62 is not limited thereto. The use ratio of the front-end nozzle that is a ratio at which the front-end nozzle ejects ink may be set to be lower than the use ratio of the middle nozzle that is a ratio at which nozzles other than the front-end nozzles eject ink, for the ink duty ratio in a predetermined range.

In particular, for example, the threshold value of the dither mask 62 may be set such that the use ratio of the front-end nozzles is lower than that of the middle nozzles only in print areas having the intermediate duty ratio (for example, the ink duty ratio of 30% to 70%). The reason is that the uneven density occurring due to a difference in the dot forming timings is not relatively easily visually distinct in a low-duty print area in which the dot density is low and dots are sparsely disposed or in a high-duty print area in which bleeding between dots is large. On the other hand, the uneven density is visually distinct in the inter mediate-duty area relatively easily.

The above-described dither mask 62 may be created as follows, for example, in a case where the threshold values of the dither mask 62 take values of "0" to "255". First, the threshold values (corresponding to the ink duty ratio lower than 30%) of "0" to "76" are arbitrarily optimized. Next, the threshold values (corresponding to the ink duty ratio equal to or higher than 30% and lower than 70%) of "77" to "179", as in the above-described embodiment, are optimized such that the largest portion of the threshold values of "77" to "179" is applied to some of the front-end dot forming positions. Then, the threshold values (corresponding to the ink duty ratio equal to or higher than 70%) equal to or higher than "180" are arbitrarily optimized. Even in such a case, for the intermediate duty ratio at which the uneven density can be easily visually distinct, the same advantages as those of the above-described embodiment can be acquired.

Figure 16:
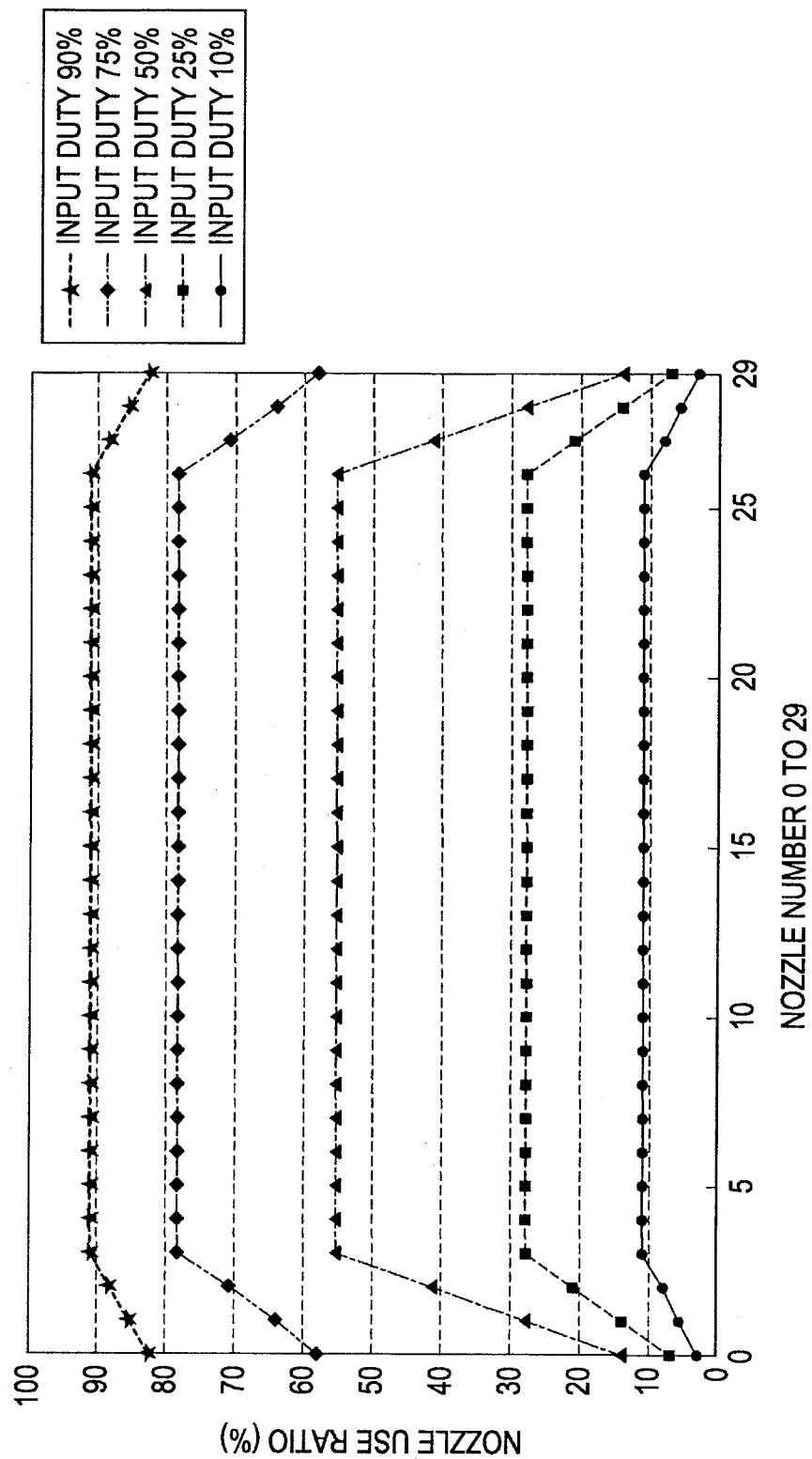
FIG. 16 is an explanatory diagram showing the characteristics of threshold values of a dither mask as Modified Example 8.

In addition, the threshold values of the dither mask 62, for example, may be set such that the use ratio of each nozzle becomes the use ratio of the nozzle shown in FIG. 16. In this example, as shown in the figure, the threshold values of the dither mask 62 are set such that the use ratio of the front-end nozzles is lower than the use ratio of the middle nozzles in any print area of each ink duty ratio. In addition, a different between the use ratio of the front-end nozzles and the use ratio of the middle nozzles becomes a maximum at the ink duty ratio of 50% and decreases as the ink duty ratio decreases to 25% and 10% or the ink duty ratio increases to 75% to 90%.

The above-described dither mask 62 may be created as follows, for example, in a case where the threshold values of the dither mask 62 take values of "0" to "255". First, a typical dither mask that uses all the nozzles equally is prepared. Next, each threshold value of the typical dither mask is converted in accordance with a nozzle of the nozzle pattern corresponding to the threshold value by using a threshold value converting table shown in FIG. 17.

Figure 17:
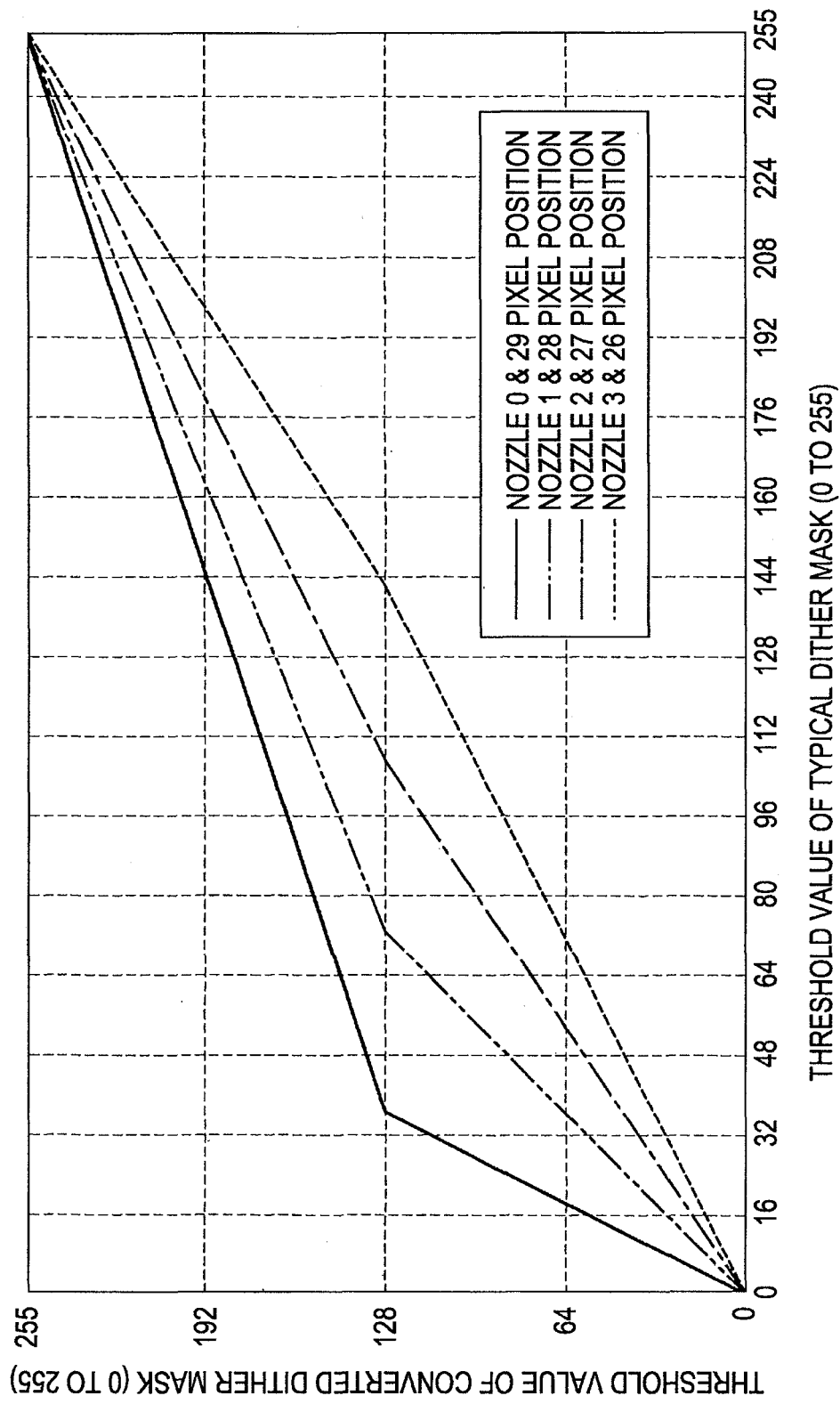
FIG. 17 is an explanatory diagram showing a method of creating a dither mask as Modified Example 8.

FIG. 17 shows the correspondence relationship between an input threshold value that is the threshold value of the typical dither mask and an output threshold value that is the threshold value of the dither mask 62. In the curve showing the conversion characteristic of the table shown in FIG. 17, for example, when the nozzles having the nozzle numbers of "0" and "29" are considered, the use ratio of the nozzle is 13.89% at the time of the ink duty ratio of 50% in FIG. 16. Accordingly, the threshold value converting table shown in FIG. 17 is reversely set such that the output threshold value is 50% in a case where the input threshold value is 13.89%. In addition, when the nozzles having the nozzle numbers of "1" and "28" are considered, the use ratio of the nozzle is 27.78% at the time of the ink duty ratio of 50% in FIG. 16. Accordingly, the threshold value converting table show in FIG. 17 is reversely set such that the output threshold value is 50% in a case where the input threshold value is 27.78%. To sum up, FIG. 17 shows a linear form acquired by performing reverse calculation such that the use ratio, which is the same for all the nozzles, at the time of the ink duty ration of 10%, 25%, 50%, 75%, and 90% is converted into the use ratio of the nozzle shown in FIG. 16. Even in such a case, the uneven density is allowed not to be visually distinct in accordance with the ink duty ratio, that is, easiness in the visual recognition of the uneven density. Accordingly, the degradation of the printing image quality can be suppressed.

B-9. Modified Example 9

In the above-described embodiment, an example in which the nozzle pattern is formed by an equal number of the nozzles has been described. However, the invention is not limited thereto. For example, a configuration in which dots are formed by partial overlapping may be used. The partial overlapping indicates that dot formation in a dot forming position is shared by nozzles of two groups that can form a dot in the same dot forming position. FIGS. 18A to 18C and FIGS. 19A to 19C show a first concrete example of the partial-overlapping nozzle pattern. This example is different from the above-described embodiment (the number of the nozzles is 30) in that the nozzle rows 92 to 97 are configured by 37 nozzles having the nozzle numbers of "0" to "36". In this modified example, the nozzles having the nozzle numbers of "30" to "36" can form dots in dot forming positions in which dots can be formed by the nozzles having the nozzle numbers of "0" to "6". Since the dot formation is shared by the above-described nozzles, the nozzles having the nozzle numbers of "30" to "36" are also called redundant nozzles.

Figures 18A, 18B, 18C:
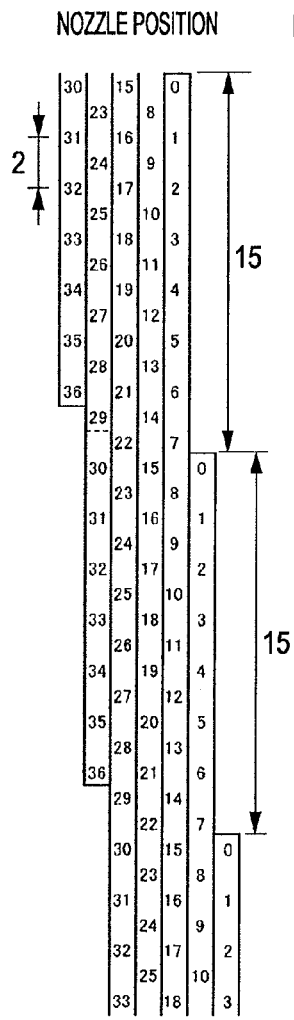
FIGS. 18A to 18C are explanatory diagrams showing a nozzle pattern as a first example of Modified Example 9.
Figures 19A, 19B, 19C:
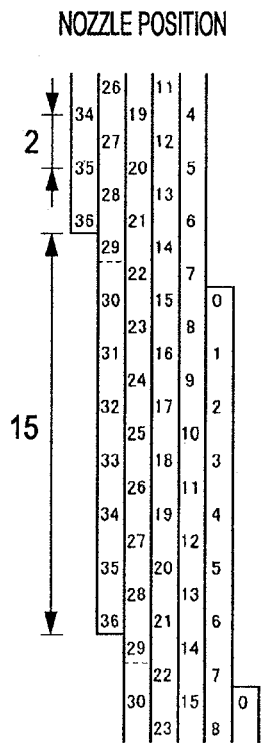
FIGS. 19A to 19C are explanatory diagrams showing a nozzle pattern as the first example of Modified Example 9.
Figures 21A, 21B:
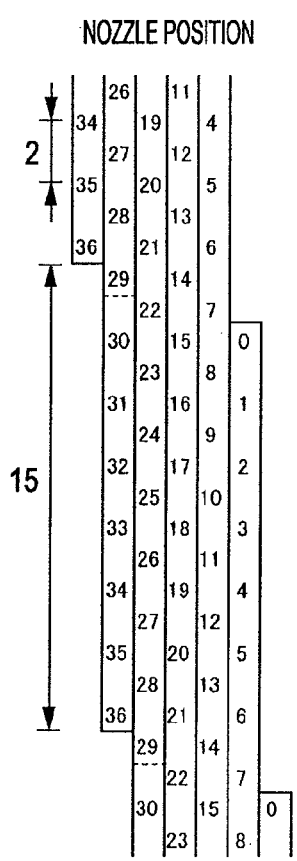
FIGS. 21A and 21B are explanatory diagrams showing a nozzle pattern as the second example of Modified Example 9.

FIGS. 18A to 18C and FIGS. 19A to 19C are diagrams showing the appearance of dot formation performed by a printer having the redundant nozzles. Although FIGS. 18A to 18C and FIGS. 19A to 19C represent one continuous diagram, due to the size of a paper sheet, the diagram is represented to be divided into two parts of FIGS. 18A to 18C and FIGS. 19A to 19C. In FIGS. 18A and 19A, the appearance of moving the nozzle row 92 in the sub scanning direction at each time of the main scanning is shown. In FIGS. 18B and 19B, at which time of the main scanning a dot formed on the printing medium is formed is denoted by using the main scanning number. The lattices shown in FIGS. 18B and 19B sequentially represent the N-th, (N+1)-th, (N+2)-th, and (N+3)-th (here, N is an integer equal to or larger than one) dots in each raster from the left side. These figures are based on the same point of view as that for the above-described FIGS. 4A to 4C and FIGS. 5A to 5C, and thus a detailed description thereof is omitted here. FIGS. 18C and 19C represent a nozzle pattern. A difference between the above-described nozzle pattern and the nozzle pattern (see FIGS. 4C and 5C) of the above-described embodiment is in that a half of the positions in which dots are formed by using the nozzles having the nozzle numbers of "0" to "6" is formed by the redundant nozzles (nozzle numbers of "30" to "36") in this modified example. In FIGS. 18C and 19C, the dot forming positions in which dots are formed by the redundant nozzles are denoted by a gray color. In such a nozzle pattern, the minimal repetition unit RU, as shown in FIGS. 18C and 19C, is configured by the 1st to 4th columns and 1st to 60th rows. According to the printer having the above-described redundant nozzles, a joining portion of dots having different main scanning numbers are scattered, and accordingly, the banding can be configured not to be visually distinct.

In the above-described nozzle pattern, for the 1st column and the 2nd column, the main scanning number is changed between a dot forming position having the nozzle number of "29" and a dot forming position having the nozzle number of "0" (for example, the 14th row and 2nd column and the 16th row and the 2nd column). In addition, for the 3rd column and the 4th column, the main scanning number is changed between a dot forming position having the nozzle number of "36" and a dot forming position having the nozzle number of "7" (for example, the 13th row and 3rd column and the 15th row and the 3rd column). The reason the position in which main scanning number is changed is different in accordance with the column is as follows. For the 1st column and the 2nd column, dots are not formed by the redundant nozzles, and accordingly, nozzles having the nozzle numbers "0" and "29" serve as nozzles disposed on both ends of the nozzle row. However, for the 3rd column and the 4th column, dots are formed by the redundant nozzles (any dot is not formed by nozzles having the nozzle numbers of "0" to "6"), and accordingly, the nozzles having the nozzle numbers of "7" and "36" serve as nozzles disposed on both ends of the nozzle row.

Even for such a nozzle pattern, when the dot suppressing threshold value is set in the same manner as in the above-described embodiment by treating the nozzles serving as the nozzles disposed on both ends of the nozzle row as the front-most-end nozzle in the above-described embodiment, the same advantages as those of the above-described embodiment can be acquired.

In addition, a second concrete example of the nozzle pattern formed by the redundant nozzles is shown in FIGS. 20A, 20B, 21A, and 21B. In this example, the sharing ratio between the nozzles having the nozzle numbers of "0" to "6" and the nozzles having the nozzle numbers of "30" to "36" is changed in accordance with the column. The minimal repetition unit RU of such a nozzle pattern is configured by the 1st to 8th columns and 1st to 60th rows. As described above, in the nozzle pattern formed by using the redundant nozzles, the size of the minimal repetition unit RU in the main scanning direction is changed in accordance with the regularity of the change in the above-described sharing ratio.

In addition, for the nozzle pattern formed by using the redundant nozzles, the dot suppressing threshold values may be set in the same manner as that is used in a case where there is no partial overlapping. In other words, in the nozzle pattern shown in the figure, the dot suppressing threshold values may be set by replacing the nozzle numbers "30" to "36" with the nozzle numbers "0" to "6" or replacing the nozzle numbers "0" to "6" with the nozzle numbers "30" to "36". In other words, the dither mask 62 represented in the above-described embodiment may be directly used in a printer having the nozzle pattern shown in FIGS. 18A to 18C, FIGS. 19A to 19C, FIGS. 20A, 20B, or FIGS. 21A and 21B. Even in such a case, the above-described advantages can be acquired to some degree, compared to a case where the dot suppressing threshold value is not set.

In addition, in such a case, the size of the dither mask 62 in the main scanning direction need not necessarily be a positive integral multiple of the minimal repetition unit RU. For example, the size of the minimal repetition unit RU of the nozzle pattern shown in FIGS. 20A, 20B, 21A, and 21B in the main scanning direction corresponds to 8 rows. However, the applied dither mask 62 has threshold value setting for which the partial overlapping is ignored. Accordingly, the size of the minimal repetition unit RU of the nozzle pattern in the main scanning direction may be a positive integral multiple (for example, corresponding to two columns) of the minimal repetition unit RU of the nozzle pattern that is configured for a case where there is no partial overlapping.

B-10. Modified Example 10

In the above-described embodiment, the configuration as the printer 20 capable of performing color printing has been shown. However, even when a printer that performs monochrome printing is used, the same advantages are acquired apparently.

B-11. Modified Example 11

In the above-described embodiment, the printer 20 is configured so as to perform the entire printing process shown in FIG. 2. However, when a computer is connected to the printer 20, a part of the printing process may be performed by the computer. In such a case, a printing system that is configured by the computer and the printer 20 can be regarded as a printing apparatus in a broad meaning.

As above, the embodiment of the invention has been described. However, the invention is not limited to the above-described embodiment. Thus, it is apparent that the invention may be implemented in various forms in the scope not departing from the basic idea of the invention. For example, the invention may be implemented as a dither mask other than the printing apparatus.

The disclosure of Japanese Patent Application No. 2009-007045 filed Jan. 15, 2009 including specification, drawings and claims is incorporated herein by reference in its entirety.

What is claimed is:

1. A printing apparatus that performs printing while relatively moving a print head in a main scanning direction and a sub scanning direction with respect to a printing medium, the printing apparatus comprising:
   a nozzle row that is installed on the print head and is acquired by aligning a plurality of nozzles, which ejects ink, in the sub scanning direction;
   a halftone processing unit that performs a halftone process by comparing each threshold value of a dither mask that is formed by a plurality of threshold values with image data that configures an image; and
   a printing unit that performs printing by controlling ejection of ink from each nozzle of the nozzle row by using a result of the halftone process,
   wherein a correspondence relationship between each position in a minimal repetition unit of a nozzle pattern indicating a nozzle out of the plurality of nozzles that is used to form a dot in each position on the printing medium and each threshold value of the dither mask that is applied to the each position is set to be constant,
   wherein the dither mask includes at least one side of nozzles that are disposed on both ends of the nozzle row or frontmost-end nozzles that serve as nozzles disposed on both ends of the nozzle row in a print area having a predetermined range of an ink duty ratio, and
   wherein the plurality of threshold values are set such that a use ratio of front-end nozzles that is a ratio at which the front-end nozzles, which are disposed within a predetermined width from the at least one side of the frontmost-end nozzles, eject ink is lower than a use ratio of middle nozzles that is a ratio at which middle nozzles, which are acquired by excluding the frontend nozzles from the plurality of nozzles, eject ink.

2. The printing apparatus according to claim 1, wherein a use ratio of the frontmost-end nozzles is the lowest of the use ratios of the front-end nozzles.

3. The printing apparatus according to claim 2, wherein the use ratio of each of the front-end nozzles is lower as the each of the front-end nozzles is aligned in a position closer to the frontmost-end nozzle.

4. The printing apparatus according to claim 1,
   wherein the dither mask is applied to front-end dot forming positions in which a dot is formed by the front-end nozzle, and
   wherein at least some of the threshold values of the dither mask are set as a dot suppressing threshold value for which a priority level for dot formation is lower than those of threshold values other than the at least some of the threshold values.

5. The printing apparatus according to claim 4, wherein the number of the dot suppressing threshold values of the dither mask is the largest in a frontmost-end threshold row, applied to the frontmost-end dot forming positions in which a dot is formed by the frontmost-end nozzle, out of threshold rows in which threshold values applied to the front-end dot forming positions are aligned in the main scanning direction.

6. The printing apparatus according to claim 5, wherein the number of the dot suppressing threshold values of the dither mask is larger in a threshold row as the threshold row is closer to the frontmost-end threshold row.

7. The printing apparatus according to claim 1, wherein the size of the dither mask in the sub scanning direction is a positive integral multiple of the minimal repetition unit of the nozzle pattern.

8. The printing apparatus according to claim 7, wherein the size of the dither mask in the main scanning direction is a positive integral multiple of the minimal repetition unit of the nozzle pattern.

9. A non-transitory computer readable medium that stores a dither mask, wherein the dither mask is formed by a plurality of threshold values and is used for a halftone process for performing printing while relatively moving a print head in a main scanning direction and a sub scanning direction with respect to a printing medium,
   wherein a correspondence relationship between each position in a minimal repetition unit of a nozzle pattern indicating a nozzle out of a plurality of nozzles, which is installed on the print head so as to be aligned in the sub scanning direction and ejects ink, that is used to form a dot in each position on the printing medium and each threshold value of the dither mask that is applied to the each position is set to be constant,
   wherein the dither mask includes at least one side of nozzles that are disposed on both ends of a nozzle row that is installed on the print head and is acquired by aligning a plurality of nozzles, which ejects ink, in the sub scanning direction or frontmost-end nozzles that serve as nozzles disposed on both ends of the nozzle row in a print area having a predetermined range of an ink duty ratio, and
   wherein the plurality of threshold values are set such that a use ratio of front-end nozzles that is a ratio at which the front-end nozzles, which are disposed within a predetermined width from the at least one side of the frontmost-end nozzles, eject ink is lower than a use ratio of middle nozzles that is a ratio at which middle nozzles, which are acquired by excluding the frontend nozzles from the plurality of nozzles, eject ink.

10. A method of printing by using a printing apparatus that performs printing by controlling ejection of ink from each nozzle of a nozzle row that is installed on a print head and is acquired by aligning a plurality of nozzles, which ejects ink, in a sub scanning direction while relatively moving the print head in a main scanning direction and the sub scanning direction with respect to a printing medium,
   wherein at least one side of nozzles that are disposed on both ends of the nozzle row or frontmost-end nozzles that serve as nozzles disposed on both ends of the nozzle row in a print area having a predetermined range of an ink duty ratio is included, the method comprising:

performing printing by controlling the ejection of ink based at in least in part upon comparing each threshold value from a plurality of threshold values with image data that configures an image such that a use ratio of front-end nozzles that is a ratio at which the front-end nozzles, which are disposed within a predetermined width from the at least one side of the frontmost-end nozzles, eject ink is lower than a use ratio of middle nozzles that is a ratio at which middle nozzles, which are acquired by excluding the front-end nozzles from the plurality of nozzles, eject ink.

* * * * *